(12) United States Patent
Stephenson, Jr.

(10) Patent No.: US 10,052,562 B2
(45) Date of Patent: Aug. 21, 2018

(54) STACK ROSTER FANTASY SPORTS GAME AND PLATFORM

(71) Applicant: Sport Gamet International LLC, Wilmington, DE (US)

(72) Inventor: Thomas Dermonte Stephenson, Jr., Lake Stevens, WA (US)

( * ) Notice: Subject to any disclaimer, the term of this patent is extended or adjusted under 35 U.S.C. 154(b) by 0 days.

(21) Appl. No.: 15/392,805

(22) Filed: Dec. 28, 2016

(65) Prior Publication Data

US 2017/0106292 A1    Apr. 20, 2017

Related U.S. Application Data

(63) Continuation of application No. 14/074,376, filed on Nov. 7, 2013, now abandoned, and a continuation of application No. 14/098,167, filed on Dec. 5, 2013, now abandoned, and a continuation of application No. 14/857,008, filed on Sep. 17, 2015, now abandoned, which is a continuation-in-part of application No. 14/074,376, filed on Nov. 7, 2013, now abandoned.

(60) Provisional application No. 61/840,303, filed on Jun. 27, 2013.

(51) Int. Cl.
*G07F 17/32* (2006.01)
*A63F 13/828* (2014.01)
*A63F 13/35* (2014.01)
*A63F 13/46* (2014.01)
*A63F 13/87* (2014.01)
*A63F 13/795* (2014.01)

(52) U.S. Cl.
CPC ............ *A63F 13/828* (2014.09); *A63F 13/35* (2014.09); *A63F 13/46* (2014.09); *A63F 13/795* (2014.09); *A63F 13/87* (2014.09)

(58) Field of Classification Search
CPC ...................................................... G07F 17/32
See application file for complete search history.

(56) References Cited

U.S. PATENT DOCUMENTS

2008/0146342 A1* 6/2008 Harvey .................. A63F 13/10
463/42
2010/0279754 A1* 11/2010 Tanenbaum ........... G06Q 50/34
463/3

* cited by examiner

*Primary Examiner* — Omkar Deodhar
(74) *Attorney, Agent, or Firm* — Lowe Graham Jones PLLC

(57) ABSTRACT

A method and system for playing a fantasy sport competition among a plurality of users includes the creation of user rosters comprising a prioritized list of players according to positions. A server receives rosters from users and invited users, each playing the game against one another from remote locations. The prioritized rosters from each user are reconciled against one another to create unique rosters for competition, and enhancements are provided to allow either user to affect the other user's roster or scoring.

4 Claims, 17 Drawing Sheets

 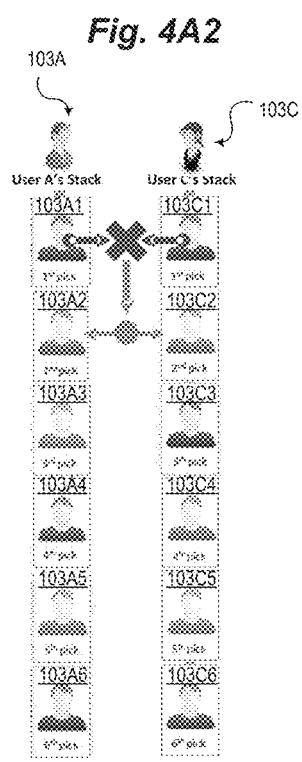 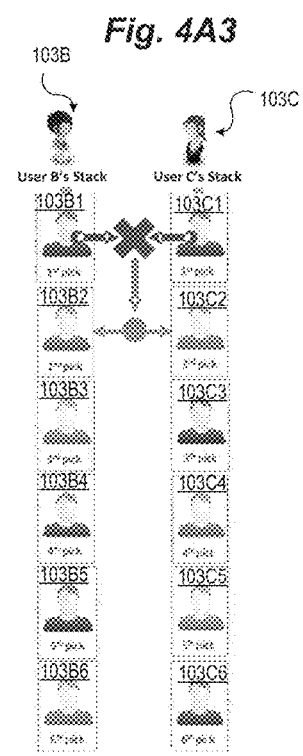
Fig. 4A1  Fig. 4A2  Fig. 4A3

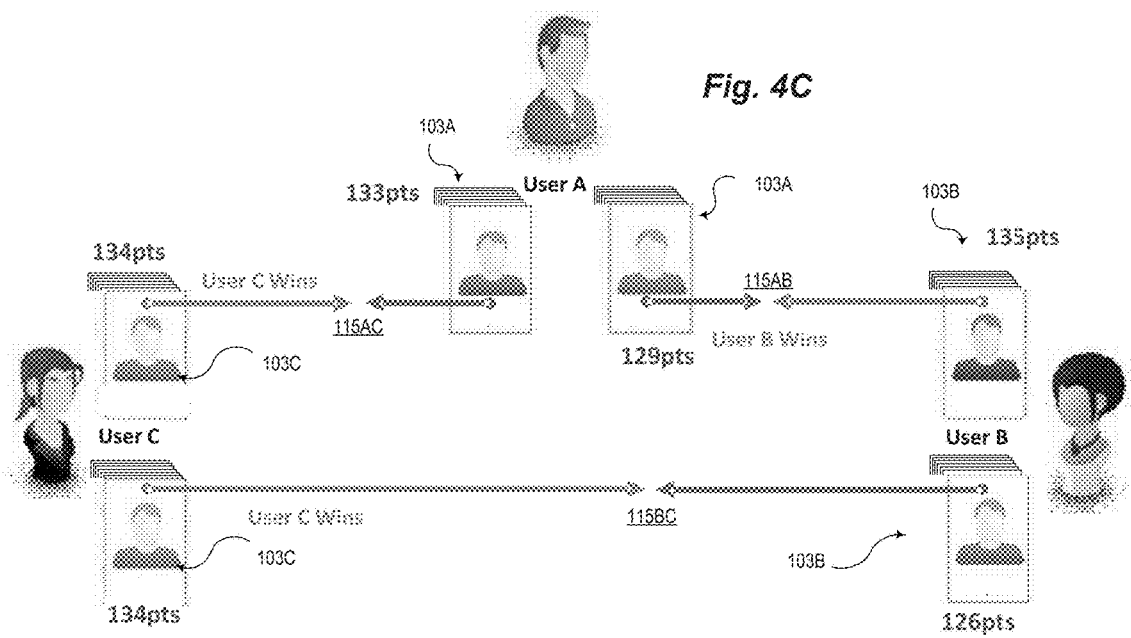

STACK ROSTER FANTASY SPORTS GAME AND PLATFORM

PRIORITY CLAIM

This application is a continuation of U.S. application Ser. No. 14/074,376, filed Nov. 7, 2013, and is also a continuation of U.S. application Ser. No. 14/098,167, filed Dec. 5, 2013, and is further a continuation of U.S. application Ser. No. 14/857,008, filed Sep. 17, 2005, which is a continuation-in-part of the '376 application cited above, and further in which each of the foregoing applications claims the benefit of provisional application Ser. No. 61/840,303 filed Jun. 27, 2013; the contents of each of the foregoing are incorporated by reference.

FIELD OF THE INVENTION

The present invention is a game played by several players on a network, and more specifically a fantasy sports game.

BACKGROUND OF THE INVENTION

Fantasy sports have enjoyed a longer and more consistent growth over the three decades since they were introduced largely due to their inherent virality. Because of their reliance on public statistics generated either daily or weekly, fantasy sports contests are inherently asynchronous, which is to say that they do not require any two persons competing to be in the same vicinity as one another to play. Even more importantly, they rely upon and foster growth of a community of competitors.

For purposes of clarity within this discussion, certain terms will be defined for use within this description.

A "User" is an individual, preferably registered on a server, who engages in game play as a manager competing within any fantasy sport hosted on the server.

An "Instigating User" is one of the Users who designates at least one other User (typically, an "Invited User") to the server, thereby to initiate a fantasy sports competition.

A "Player" is any athlete or other individual competing in a real-live sporting event from which statistics are garnered, examples of which are baseball players, basketball players, soccer players, football players, race car drivers/race cars, mixed martial artists, etc.

A "Season" is any defined interval of competition between Users. The season may coincide with a season as recognized by the governing authorities of the various sports or it may be one defined by the Users, such as a single day of competition. Seasons can even span multiple years, if the Users so define the Season. Any interval of play for which statistics can be reliably garnered may be defined as a season by the Users.

Fantasy sports often involve team sports and the draft process requires various player positions to be filled. The number of Players a User claims is dependent upon the rules of the sport the Player is playing and/or the manner in which each individual fantasy sports game is devised, and would therefore be any number of Players.

Fantasy sports are any of several games where Users manage a roster of Players drawn from any group for whom statistics are compiled. In each of the possible sports ranging from NFL football to MLS soccer to NASCAR racing and those many other sports for which news sources publish statistics, a fantasy sport game exploiting those statistics can be devised. Users rely upon their ability to acquire and field a team of athletes pursuant to such rules as the group of Users define or adopt. Users compete against one another receiving points for their acquired Players' real life statistics as the Players compete in their real-life sports. Any injury or other impediment a Player suffers in the season is reflected in the resulting statistics a Player garners for the season in question. Similarly, any particularly good performance will shift a Player's statistics upward. In short, just as a real-life general manager in a sport must contend with the vagaries of the performance of human athletes that make up his team, so, too, does the fantasy sports User. As such, the fantasy player User gets to sample, vicariously, the "thrill of victory and the agony of defeat" by imparting a personal stake in each Player's performance.

The advent of powerful computers and the Internet revolutionized fantasy sports, allowing scoring to be done entirely by computer, and, thereby, allowing leagues to develop their own scoring systems, often based on less popular statistics. In this way, for example, fantasy baseball has become a sort of real-time simulation of baseball, and allowed many fans to develop a more sophisticated understanding of how the real-world game works. According to statistics from a 2009 article in Forbes, nearly 11 million people play fantasy baseball today, in all fantasy sports, Ad Week estimates nearly 32 million people.

Determining standings in a season generally occurs at fixed intervals because standings rely upon statistics derived from diverse events. For example, baseball games may occur three times a week for one team and as many as five times a week for another team and the schedule will vary from week to week. A User may have team members drawn from each of several teams with distinct schedules and match ups. Thus, algorithms used for generating standings may be updated, for example, either daily or weekly.

Because scores rely upon diverse games to make up any one User's standing, the play of fantasy sports is inherently asynchronous, which is to say that two Users will not necessarily know at the same time what scores they have derived from a week of play. Unlike watching an event such as the Super Bowl, two fantasy sports Users will not generally come together to watch a single event as their individual standings may not rely upon that event. Standings do not require any two persons competing thereby to be communicatively connected to each other to play, once each User has drafted his or her team. The draft is the one occasion for gathering the Users in a league, into each other's presence or at least in communication over a computer network.

Generally, as the play in all fantasy sports centers on the manager's staffing decisions, the teams are rated on the performance of each of a roster of athletes and the associated statistics they accumulate as the season progresses. As such, the original draft and subsequent trades present User managers with their scoring opportunities. Users, as managers, often draft teams before the season begins (or very shortly thereafter). One conventional approach is to hold an auction, whereby each User as manager has a fixed amount of money to bid for athletes, and he must fill his team's roster within their budget. Another conventional approach is to perform a serpentine system draft of available athletes until all teams are filled. Because selecting and trading athletes is the key issue that defines the play of any fantasy sports game relative to mark performance as against other manager Users, each variant that changes that process creates a distinct game.

Conventionally, fantasy sports have Users organized into leagues. One such league in fantasy baseball is known as the Roach Motel League, founded in 1981 at Columbia University in New York. Original Rotisserie League member Glen Waggoner was an administrator at Columbia and he passed along the rules to a group of undergraduates. The Roach Motel League, still consisting primarily of original members, has held a draft and played the game every year since 1981. But, absent such an infrastructure, there is no good way to organize head-to-head or three-way competition where there is not enough available Users to populate an entire league. Because league play is also rather slow, it would be advantageous for any user to have the opportunity to play in several distinct groups. Nonetheless, a User may not wish to order their choices to actually participate in distinct Player drafts for each group.

Although computers and networking have greatly expanded the ability for geographically diverse players to engage in fantasy sports contests, the game play is largely one in which drafts occur at the beginning of a season and late-comers are left out. Conventional computer systems and rules are not equipped to handle a spur-of the moment challenge between any two individuals, including Users who are randomly assigned or who otherwise have not participated in a mutual draft. Certain daily draft contests allow players to choose groups of athletes and compile a score based on the statistics of those athletes, but this form of game play is not truly head-to-head, and allows common or overlapping selections of players and an anonymous contest more similar to a lottery than an actual game.

SUMMARY OF THE INVENTION

A method and system for playing a fantasy sport competition among a plurality of Users includes a system for transmitting User selections to suitably order Players in the User roster comprising a User prioritized list of Players according to positions, such that for each position the User has reflected a plurality of choices in order of User preference. A server receives Invited User rosters from each Invited User. Each Invited User roster includes that Invited User's prioritized list of Players according to positions. To create Stack Roster pairings, the User is compared with each Invited User and each Invited User with each other. Where two Users select a single player for the same position within a Stack Roster pairing, the system and method move on to compare both Users' next selection of Player at a position, until each can be given their choice of Player.

In one preferred implementation, a computer-implemented method for enabling a user to play an online fantasy sports game comprises providing, from a server computer system, a plurality of available players at a plurality of available positions. A first user selects a first roster by operating a first client device having instructions stored on a non-transitory computer readable medium, the first client device being communicatively coupled to the server computer system over a network, the first user roster being drawn from the plurality of players at the plurality of positions, the first user roster further comprising a prioritized list of multiple players at each of the plurality of positions.

A second user selects a second user roster by operating a second client device having instructions stored on a non-transitory computer readable medium, the second client device being communicatively coupled to the server computer system over a network, the second user roster being drawn from the plurality of players at the plurality of positions, the second user roster further comprising a prioritized list of multiple players at each of the plurality of positions.

Each of the first and second users transmit their respective first user roster and second user roster to the server computer system. The first user is then able to invite the second user to participate in the online fantasy sports game via the first client device, and the second user accepts the invitation via the second client device, the steps of inviting and accepting occurring either before or after the steps of providing, selecting a first user roster, selecting a second user roster, and transmitting.

Because the first and second users may have overlapping rosters, such that each roster includes some of the same athletes, the server computer system reconciles the first user roster and the second user roster, the server computer system having stored programming instructions operable by the server computer system to compare the first user roster against the second user roster and to produce a first user stack roster and a second user stack roster, each of the first user stack roster and the second user stack roster comprising a unique set of a single player at each of the plurality of positions. No prior fantasy sports game, whether computer implemented or otherwise, has been able to achieve this reconciliation to force unique rosters for each player, particularly where the players have drafted their rosters independently, and even without prior knowledge of one another's drafts.

Ultimately, the server computer system determines a score associated with each of the first user stack roster and the second user stack roster as a function of a statistical performance of each of the players on the first user stack roster and the second user stack roster, the server computer system being communicatively coupled to an associated database of the statistical performance of each of the players.

In accordance with some versions, a method and system for playing a fantasy sport competition among a plurality of Users includes transmitting a User roster comprising a User prioritized list of Players according to positions; and transmitting User selections of Enhancements, each Enhancement comprising a scoring exception from an adverse Player statistic for any Player the User roster comprises. Upon receiving the User rosters, the system stores the User roster in association with the League to facilitate scoring among the Users. Upon receiving the User selections of Enhancements, the system stores the Enhancements in association with the User roster. The system also receives statistics for Players at intervals over the course of the Season. Periodically and at the end of the Season, the system calculates scores of Users based upon the Player statistics and the Enhancements.

In some examples, the method and system encourages the implementation and execution of strategic choices beyond the selection of Players to fill a fantasy roster and these choices do not currently exist in fantasy sports play. The User will exercise techniques of game thinking, mechanics and gamification to engage other Users and to add additional depth to the typical fantasy sport. Using the system and method, the User's natural desire for competition and achievement allows for specific further participation even after selecting the Players for the season. For example, where a great quarterback is playing behind a line that regularly allows sacks, the User having that quarterback on his roster can enhance the statistical performance by purchasing Enhancements to "bond around" the quarterback's known weakness. The introduction of these gaming and strategic components into the existing fantasy sports equation will create mechanisms for players to have greater control over outcomes, will fundamentally alter the manner in which fantasy sports is widely known to be structured, and will thereby give birth to a Fantasy Sports Gamification System.

BRIEF DESCRIPTION OF THE DRAWINGS

Preferred and alternative examples of the present invention are described in detail below with reference to the following drawings:

FIGS. 4A1, 4A2, and 4A3 are a graphical representation of a process of roster reconciliation of rosters in an exemplary Stack Roster "draft" for a fantasy sports game.

FIG. 4C is a graphical representation of sample scoring during a "season" in an exemplary interface for enabling a Stack Roster "draft" for a fantasy sports game.

DETAILED DESCRIPTION OF THE PREFERRED EMBODIMENTS

The primary event that defines fantasy sports play is the User's selection of Players to form a user roster. Rather than to begin the explanation of the invention with a description of the mechanics that enable a User's selection of Players for play in a group of Users, beginning the description at a higher level will make the later description of those mechanics much more understandable. In its preferred form, the invention is practiced on a network such as the Internet by interaction with an interface that is generally represented in interaction with the User in the figures described below.

Figure 1A:
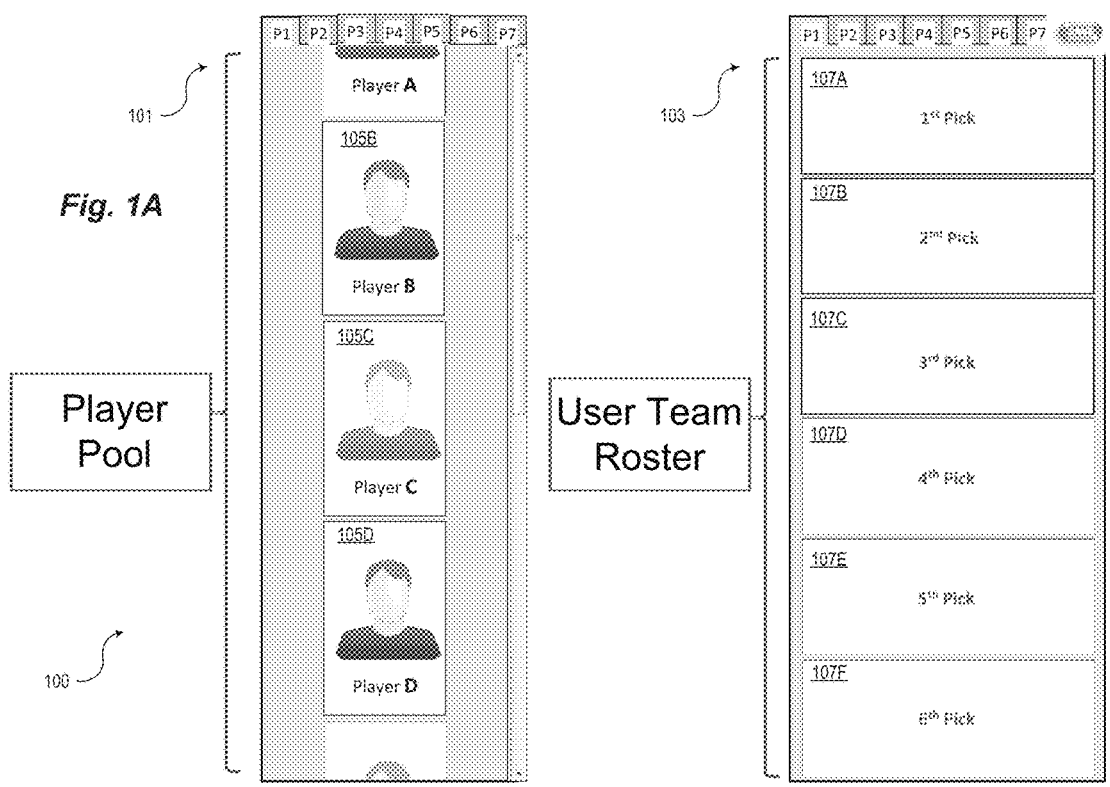
FIG. 1A is a graphical representation of first step in an exemplary interface for enabling a Stack Roster "draft" for a fantasy sports game.

User Team Roster Selection. Beginning with a User's eye view of the process at FIG. 1A, an Instigating User, after appropriately signing into the system, providing such information and funds as are necessary to qualify for participation, is presented with an interface screen 100 having two principal features, generally similarly configured roster elements: 1) a Player pool 101; and 2) a User Team Roster. In the presently preferred embodiment, these roster elements are as shown, but the invention could be practiced with graphic elements that display player identities such as tile-like icons shown in FIG. 1A and referred to as "tiles" 105B, 105C, and 105D and graphically represented receptacles to receive those tiles referred to as "slots". While these same functions could as easily be represented in a range of graphic representations, even in a simplest form in textual lists representing each of the Player pool 101 and the User team roster 103, the graphic representations shown in FIG. 1A is most readily adapted to this explanation of game play.

The Player pool in this embodiment is further divided by positions. For example, such positions might include a quarterback, a running back, a wide-receiver and a tight end in NFL™ football and, by contrast, a pitcher, a catcher, and a first baseman, etc. in MLB™ baseball. Similarly each sport would have its own designation for such positions. In order to facilitate display identities of the numerous players that would make up a roster, the configuration of the presently preferred embodiment may optionally be divided into pages, each page representing a position as the sport defines it. Thus the pool 101 is divided into pages such as 101P1, 101P2 etc., while the User team roster is similarly divided into pages such as 103P1, 103P2, etc. Advantageously, in the presently preferred embodiment, selecting a page on one of the pool 101 or the roster 103 will result in both the pool 101 and the roster 103 displaying the corresponding pages, e.g. selecting page 2 (that is, P2) in the roster will cause page 2 to display in each of the roster and the pool.

In some sports, such as NASCAR™ auto racing, generally only drivers receive recognition with published statistics and so there are no distinct positions but rather a team comprising several drivers. For such sports, the pool 101 and the roster 103 may not be divided into individual positions as there is no useful distinction that would make such a division useful.

In such a case, the position would not be necessary or included to selectively display distinct portions of the roster 103 and the pool 101.

A User must now populate the Instigating User's team roster 103 from the Player candidates listed in the pool 101. Once again, the presently preferred embodiment involves moving tiles such as 105B, 105C, and 105D from the pool 101 to the Instigating User's team roster 103 to occupy one of the slots 107A, 107B, 107C, 107D, 107E, and 107F. Though a drag-and-drop interface is described, the selection may be practiced in several alternate embodiments, including, as discussed above, creation of textual lists. The presently preferred embodiment is described to illustrate movement of Players from the pool 101 to the User's team roster 103 and further to illustrate prioritization of the User's team roster 103, through the use of tiles 105B, 105C, and 105D and slots 107A, 107B, 107C, 107D, 107E, and 107F as enabling a graphical user interface.

Figure 1B:
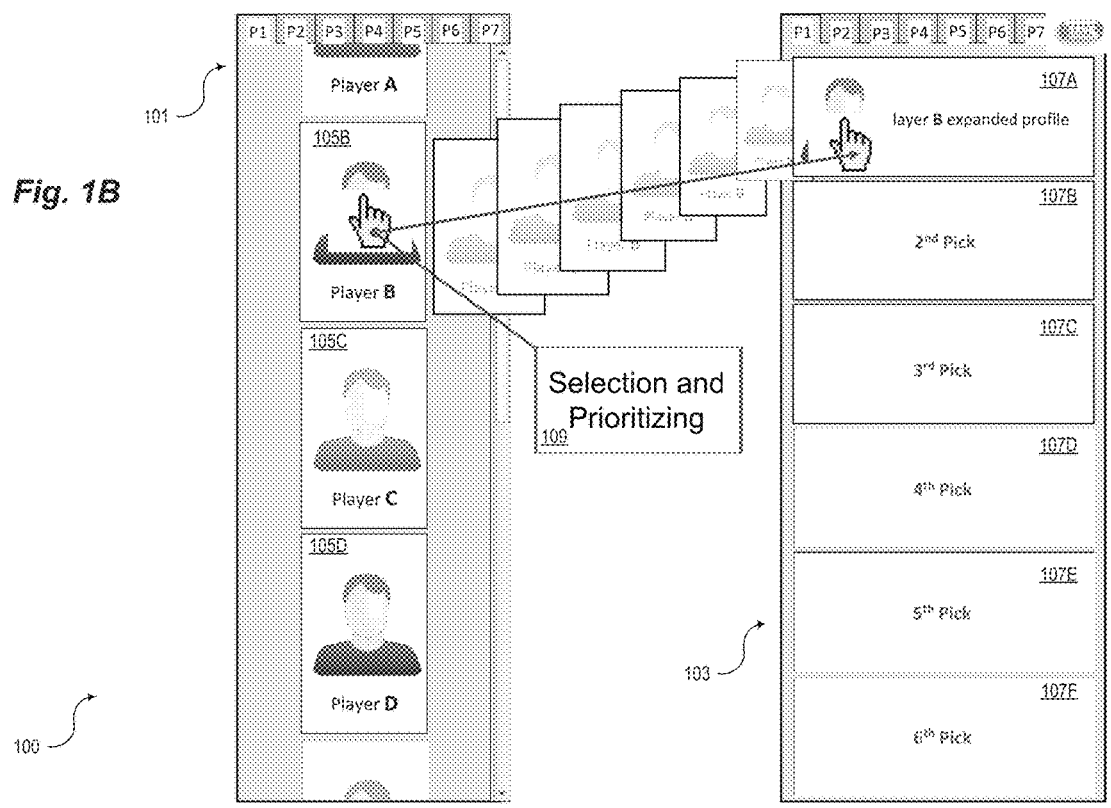
FIG. 1B is a graphical representation of second step in an exemplary interface for enabling a Stack Roster "draft" for a fantasy sports game.

A User populates the team roster 103, As shown in FIG. 1B by dragging a tile in a selecting move 109, in this case tile 105B, to one of the vacant slots, in this case 107A, on the User team roster 103 and as a result performs two constituent steps, one of selecting a Player and one of placing a priority on the Player. Additionally, further moves of selecting and prioritizing 109 may occur as are dictated in various embodiments of the instant invention. For example, each Player may have a value attached to the player, the value being the price of acquiring the Player, analogous to salaries in real life sports or even the actual annual contractual salary of the Player. At this point, the values are merely noted in this embodiment and are subject to subsequent steps when an actual User's team roster is determined by the reconciliation described below. These values place additional realistic constraints on the User in forming teams, thereby further mimicking constraints on real-life team managers, as will be further explained below.

The graphic interface 100 inherently presents certain advantages in that the movement of tiles such as tile 105B inherently removes the player from the pool 101 to the roster 103 preventing duplicate designations of Players as being on the User's team roster 103.

The User continues selecting Players in the manner described above until all of the slots 107A, 107B, 107C, 107D, 107E, and 107F. (Six slots being shown only as a non-limiting example; the invention can be practiced with more or fewer slots as selected rules may dictate). The User may also move a Player tile 105B from one slot 107A to another slot 107C to adjust priority among the several choices until all six of the slots 107A, 107B, 107C, 107D, 107E, and 107F are filled and ordered according to the priority the User places on each Player. Likewise, the User progresses through each of the positions, moving from page 101P1 through 101P7 of the pool and similarly through pages 103P1 through 103P7. The interface works to afford the User suitable opportunity to make selections and set priorities throughout the User team roster.

Figure 1C:
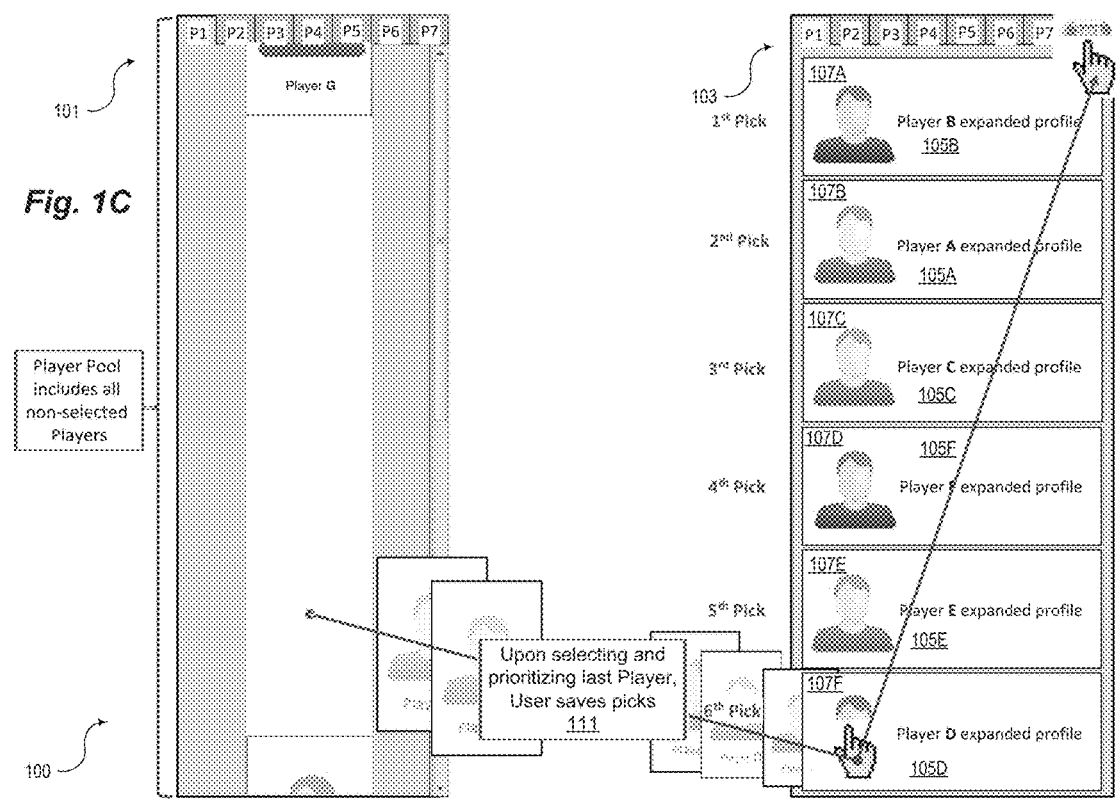
FIG. 1C is a graphical representation of third step in an exemplary interface for enabling a Stack Roster "draft" for a fantasy sports game.

Referring to FIG. 1C, at some point the User has completely populated, reviewed and prioritized the User's team roster 103 by filing, in this non-limiting case slot 107A with Player B's tile 105B, slot 107B with Player A's tile 105A, slot 107C with Player C's tile 105C, slot 107D with Player F's tile, slot 107E with Player E's tile 105E, slot 107F with Player D's tile 105D and has similarly filed each of the other player positions 103P2, 103P3, 103P4, 103P5, 103P6 and 103P7 to populate each to reflect selections and organize the selections at each position according to the User's priorities. Having suitably filled the roster 103, the User executes a save by clicking 111 the "Save" button on the roster 103.

Figure 2:
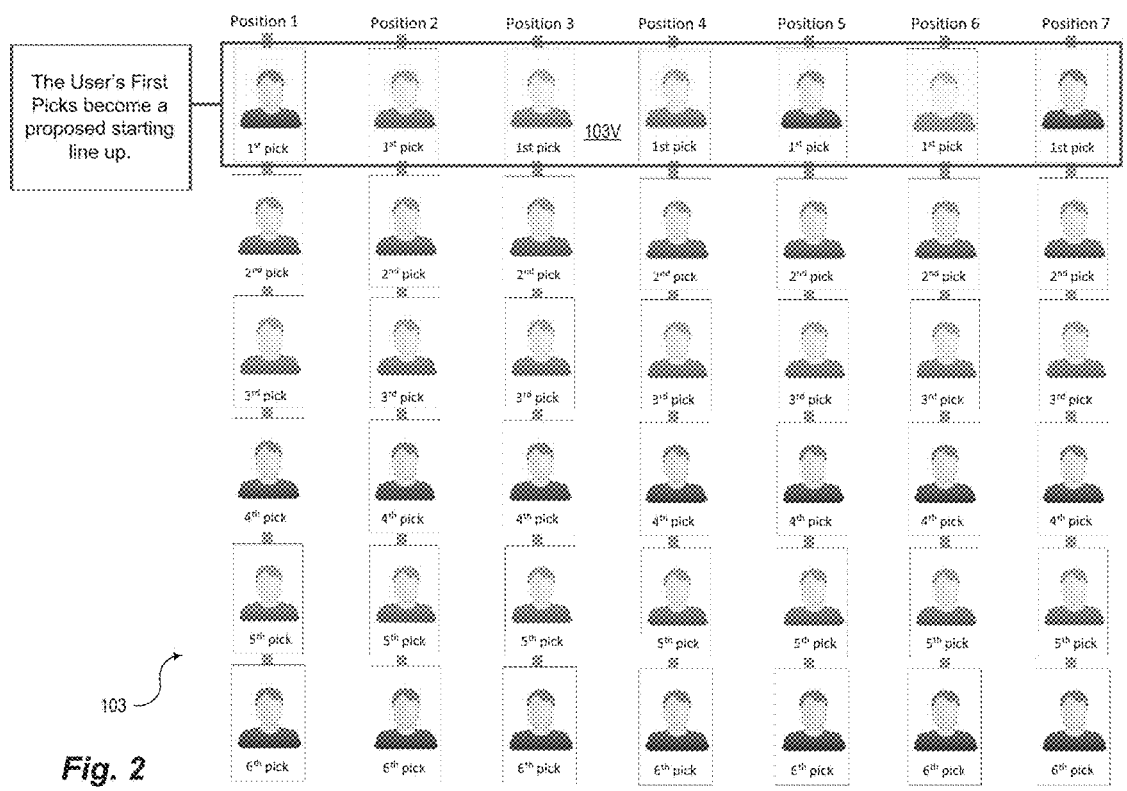
FIG. 2 is a graphical representation of the resulting roster in an exemplary interface for enabling a Stack Roster "draft" for a fantasy sports game.

The Roster Stack. Depicted in FIG. 2, the roster 103 has a structure indicating User selections and prioritization. The top line picks illustrated in FIG. 2 represent the User's desired "starting lineup" 103V ($1^{st}$ or top picks for each player position) for competition against other Users. Ultimately, the actual Players that represent the User in fantasy competition are determined by the "Stack Roster Match Up" process, which is described below and which is initiated when one Instigating User invites one or many other Invited Users to engage in competitive fantasy game play. In actual play, it will be a rare occasion where a User will get all of his intended first line-up 103V but such would happen in the rare case where the User would select as first picks Players no other User had selected. The data structure of the roster 103 is made clear by the graphic portrayal: along the x-axis (that is, across horizontal rows), positions are set forth in a manner determined by the platform and along the y-axis (that is, vertical columns), players are ordered at each position in accord with the preferences of the User with the most favored having the top position. (For the sake of disclosure, there is nothing in the inherent structure of the invention or its practice that requires that the number of picks be the same for each position. As rules are adopted for each fantasy sport, the number of picks can, likewise, be adopted, resulting in a data structure matrix that may not match a perfect rectangle in rank and file).

In a particular example involving fantasy football, position 1 may be quarterback, position 2 may be running back, position 3 may be wide receiver, and so on. Though seven positions are shown, games may be played with more or fewer positions. Likewise, in FIG. 2 the User has indicated up to six picks for each position, meaning six quarterbacks for position 1, six running backs for position 2, and so on. Again, in a particular version users may select more or fewer players per position.

Figure 3:
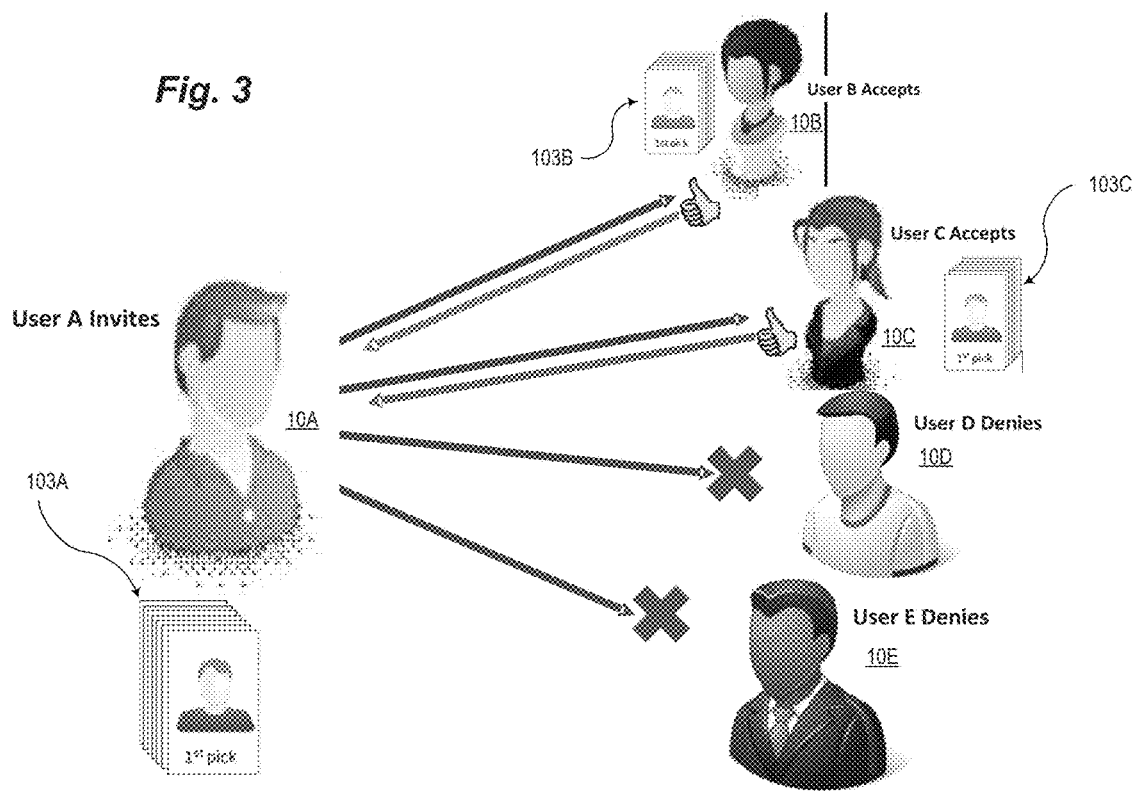
FIG. 3 is a graphical representation of a challenge to initiate play in an exemplary interface for enabling a Stack Roster "draft" for a fantasy sports game.

Inviting Users to Play. As FIG. 3 depicts, having once assembled a User team roster 103A, the very quality of the instant invention is the inherent virality possible due to the ability to assemble competing Users outside of the construct of a league. To demonstrate, an Instigating User A 10A may now invite other users, here portrayed as other Users B-E 10B-E, to compete against in fantasy play. (Necessarily any User must have a completed User's team roster in order to play, but the number of users need not fall neatly into such as might be necessary to populate a bracket). Invited Users B-E 10-B-E need not be persons having any prior relationship with the Instigating User A 10A. For this reason, the platform, in one embodiment, can receive and add Users to forming groups of Users on a random or on a referral basis. Similarly, one Instigating User 10A can participate in any number of distinct groups using the same roster 103A because of the capabilities of the engine to distinctly reconcile multiple User team rosters 103A-E for each distinct group. The capabilities of the instant invention stem from the roster reconciliation described below.

Once the Instigating User 10A has successfully created a User team roster 103A, the User A 10A may elect to invite several other Invited Users 10B-E (by way of nonlimiting example) to play by using the platform as described below. The Instigating User A 10A may also ask the platform to assign or find other Invited Users 10B-E to play in the group as the Instigating User A 10A may request. Each registered User 10A-E has a unique identification which allows the Instigating User A 10A to send invitations to selected friends and acquaintances whose identification is known to the Instigating User A 10A through the platform. In each instance of User selection, the platform delivers an invitation to play to identified Invited Users 10B-E.

Once an invitation has been issued from Instigating User A 10A to each other identified Invited User B-E, the Invited Users 10B-E are given the opportunity to accept the invitation. Such of them who accept become the competing group. For example, in FIG. 3, Invited User B 10B and Invited User C 10C each accepts the invitation; Invited User D 10D and Invited User E 10E each decline. The platform will receive the User team rosters 103B, C along with the User A roster 103A for the roster reconciliation process to ultimately determine the Players that will represent each User 10A-C in fantasy competition. In this manner, the process fosters a gaming community in the same manner as social video games in that the invitation process serves to leverage the player's social network. Such an invitation process allows the game to serve to build a community as playing is only possible if a User "shares" his game with friends.

Stack Roster Reconciliation. The User team roster each User has built out according to the above discussion merely represents that User's desired or proposed lineup. Much like the notes a General Manager takes into a draft for any of several professional team sports, the User Team Roster is more like a "wish list" in that it does not reflect actual choices allowed relative to each other User. Ultimately, the Players that will accrue points on behalf of the User, based on the User's actual lineup that will compete in fantasy play, will be determined by the process referred to as the "Stack Roster Match Up." In the Stack Roster Match Up, each User's team roster will be treated as a set of stacks, one player stack for each position as is shown in FIG. 2. Within each stack, specific players from a User's team roster are matched up with another User's stack relative to the same position, starting with the first pick for each User and progressing to the second pick and so on. In the event both Users have selected the same player as their first choice, they will cancel one another out, resulting in neither User being able to utilize that particular player against the other in active/actual game play. As a result of the cancelling move, the process moves to the second choice in the position stack for each User, again comparing the respective second picks against one another for the position. This process will continue moving down the stack of players until each User has a selection that is different from that of the other User. The first two players that are not identical on a given tier will represent the players assigned to the Users in that position for actual fantasy sports game play/competition.

A first example of a stack roster comparison is shown in FIGS. 4A1, 4A2, and 4A3, in which three Users are competing. As shown in FIG. 3, Instigating User A 10A, has invited Invited User B 10B and Invited User C 10C to play and each has accepted. Users receive points by head-to-head competition with each of the other Users in the group of Users by comparing the scores aggregated over the Season by the Players each User carries on his or her roster (or, in some versions, by comparing scores aggregated for a single week or a single day). As each of the Players is presumed to accumulate distinct statistics over the Season, it is desirable for Users to have distinct rosters. In competition between the Users, the Users are grouped into competing pairs, and the rosters of each of the two Users in the competing pair of Users are reconciled such that relative to each other, each User has a distinct Player occupying each position on the User's roster.

Thus, to assign the available Players to each of the Users in a competing pair to most closely meet their selections as expressed in their User Roster, the method of reconciling is depicted in FIG. 4A1. Beginning with a hypothetical competing pair ("Stack Roster pair") comprising the Instigating User A 10A, and the Invited User B 10B, a roster for competition relative to User B 10B is derived from the User Roster 103A, Instigating User A 10A submitted, when that roster is compared to the User Roster 103B, Invited User B 10B submitted.

As a result, each User has a roster relative to the other User in the competing pair which is constructed as shown. Position by position, each of the User rosters such as roster 103A of User A is compared to the corresponding roster such as roster 103B of User B to yield specific Stack Rosters for each User relative to the other. In Instigating User A's User roster 103A, the Player occupying a position is compared to the Player on User B's User roster 103B at the same position and in the corresponding choice in order to compare for matching selections. As in this example, Instigating User A designated a first pick 103A1 and, probably by virtue of that Player's excellence in an earlier season, Invited User B has designated the same player 103B1 as her first pick. According to the rules of the Stack Roster, relative to each other, the choices 103A1 and 103B1 cancel because the Users cannot be assigned the same player at a single position, requiring the Stack Roster platform to move to the second choices. Comparing second choices 103A2 to 103B2, Instigating User A and Invited User B have chosen the same player again, causing those choices to cancel as between Instigating User A and Invited User B. Similarly the third choices 103A3 and 103B3 cancel as do fourth choices 103A4 and 103B4. It is not until the fifth choice where Instigating User A and Invited User B have selected different Players in their stacks. Thus, relative to each other, Instigating User A will play his fifth choice 103A5 in his roster 103AB relative to Invited User B who will play her fifth choice 103B5 as the same is shown in her roster 103BA relative to the Instigating User A. This process described above is repeated as between User A and User B for each position, until User A and User B each have been assigned a unique roster for competition.

The Stack Roster reconciler now moves, as shown in FIG. 4A2, to generate the rosters of Instigating User A relative to Invited User C (rosters 103AC and 103CA respectively) and Invited User C's relative to Instigating User A (rosters 103BC and 103CB respectively). In forming the desired rosters 103AC and 103CA prior to game play, Users A and C have both selected the same first preferred choice 103A1 vs. 103C1. Because these identical preferred choices produce a match, neither User keeps the Player at the position. The Stack Roster reconciler then moves to the second choices 103A2 and 103C2 for both users and finds them to be distinct. At that point, the distinct players are assigned for use in the particular game. Position by position, in a like manner to that of FIG. 4A1, rosters 103AC and 103CA are populated to fill a team for each User. Importantly, while they are both derived from Instigating User A's User roster 103A, in roster 103AB at this position, relative to Invited User B, Instigating User A is playing 103A5 in this position; whereas in roster 103AC, relative to Invited User C, Instigating User A is playing 103A2. There is no inconsistency in having the Instigating User A playing distinct rosters 103AB and 103AC in this competition, and to do so, adds an appealing ripple to such games.

Similarly, as depicted in FIG. 4A3, relative to Invited User C, Invited User B will play her second choice 103B2 against Invited User C's second choice 103C2, as shown in FIG. 4A3. Just as relative to Instigating User A, Invited User C has expressed in her User team roster 103C, the same first choice 103C1 as has Invited User B as her first choice 103B1. As the rules dictate, these first choices cancel resulting in the selection of the second choice relative to each other.

The Stack Roster Match Up process illustrated in FIG. 4A1, 4A2, and 4A3 would continue in the same manner deriving the rosters for all game participants relative to each other, progressing through all of the positions until each of the Users have full and complete Stack Rosters relative to each other (By the convention above, User A has 103AB and 103AC; User B, 103BA and 103BC; and User C, 103CA and 103CB.). The User(s) are then ready to engage in actual "consequential" fantasy game play against one another as shown in FIG. 4B, the outcome of which will be determined by the performance of the actual Players that populate each of the Users several rosters.

Competition and Scoring. As is evident in FIG. 4B, play between three users actually results in three distinct competitions for points: Instigating User A's roster 103A (after being reconciled, as discussed above) is compared to Inviting User B's roster 103B (after reconciliation) in competition 115AB (taking into account the earlier described method of selection relative to each User); Instigating User A's roster 103A against Invited User C's roster 103C in competition 115AC; and Invited User B's roster 103B, against Invited User C's roster 103C in competition 115BC.

The competitions are each scored first as derived in each of the distinct competing pairs. The Players (actual athletes on the respective rosters) play out their regular sporting events and will accumulate statistics that are scored on each of the rosters that contain their names over the course of the Season (or the course of a day, or other desired period). Referring to FIG. 4C, in a hypothetical Season (or a hypothetical day or other period of real-world contests), where Instigating User A's roster 103A is compared to Invited User B's roster 103B (placed in competition 115AB), the two reconciled rosters are compared position by position to accumulate a total across the entirety of each User's rosters.

In scoring the several rosters, we see Instigating User A's roster 103A of Players accumulated a statistic of 129 points relative to Invited User B's roster 103B which garnered 135 points. In competition 115AC where Instigating User A's roster 103A is played against Invited User C's roster 103C, Instigating User A's roster 103A scored 133 points against Invited User C's roster 103C which scored 134 points to take the win. Invited User B's roster 103B is compared against Invited User C's roster 103C in competition 115BC where the 134 points scored by User C's roster 103C easily outdistanced the 126 points scored by User B's roster 103B. Other variants may be used where, for example, a pitcher's unique statistics are weighted against those of catchers or fielders. Likewise, quarterbacks' unique statistics may be weighted to move the outcome more than that of defensive centers.

While rules may vary without changing the essential nature of the fantasy game, the most straightforward embodiment of the invention simply totals points scored in each of the three competitions 115AB, 115AC, and 115BC, yielding a win for Invited User C having a total of 268 points, bettering both Instigating User A and Invited User B at the relevant position. While the winning or losing has been defined in this particular example by the performance of each User's selected Players at only one position, the rosters will, in most preferred versions, consist of several positions that are used in most sports. These narrower examples have been provided simply to better explain the exact nature populating rosters and deriving scores. Accordingly, the relative scores are preferably the scores earned by each user for the user's entire roster of reconciled players (rather than a single player at a single position), compared against the scores earned by the other competing users for their corresponding reconciled rosters of players at all positions.

Figure 5A:
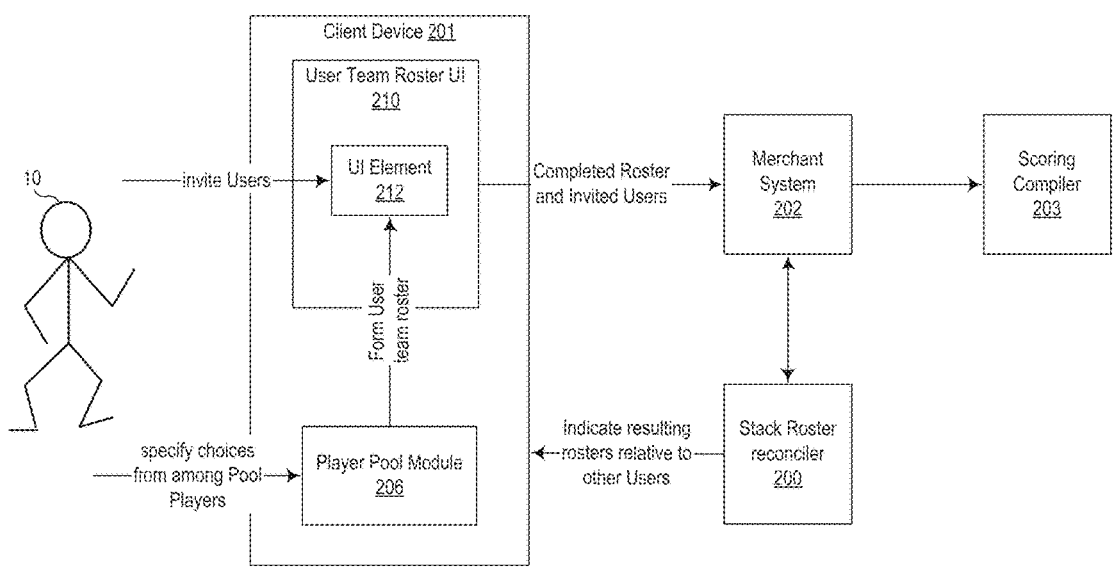
FIGS. 5A, 5B, and 5C are a block diagram representation of a data structure in an exemplary interface for enabling a Stack Roster "draft" for a fantasy sports game.
Figure 5B:
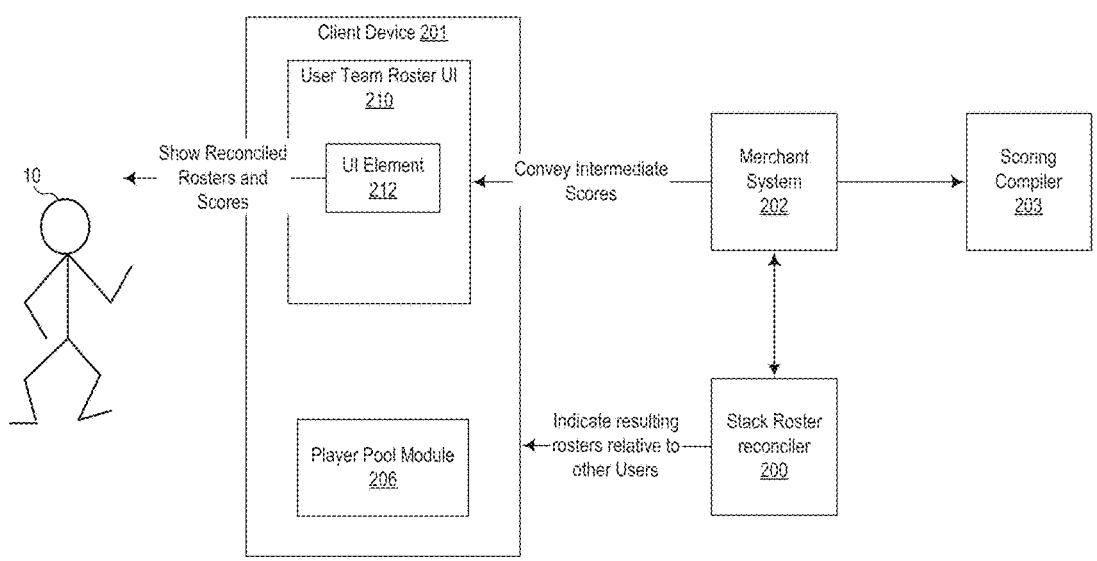
Figure 5C:
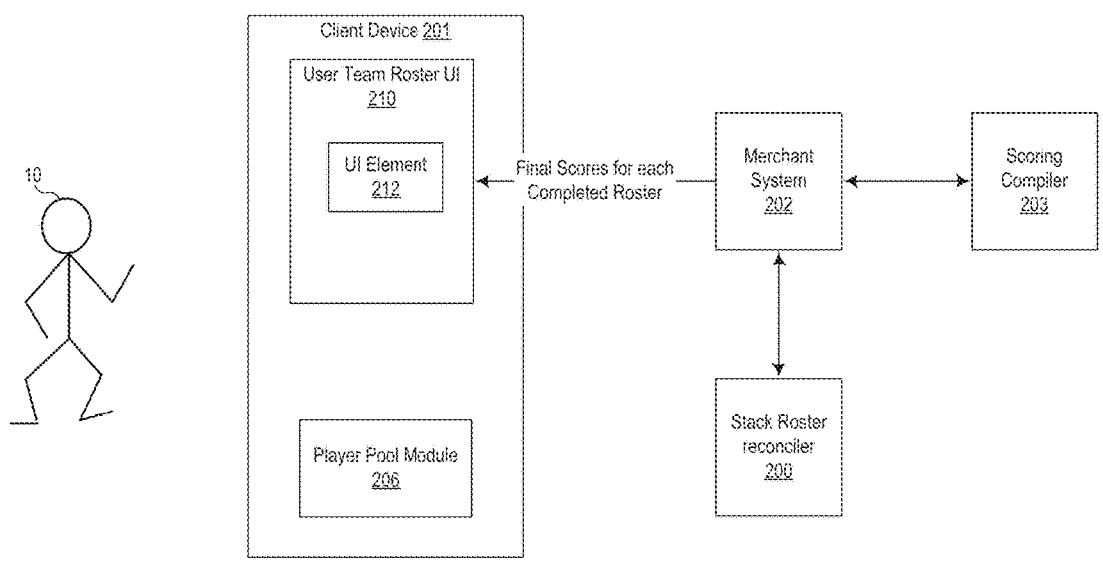

Platform and Structural Implementation. FIGS. 5A-5C are example block diagrams illustrating data flows within the Stack Roster platform according to example embodiments. FIG. 5A illustrates an arrangement of systems, modules, and devices according to one embodiment. The illustrated arrangement includes a Stack Roster reconciler 200, a client device 201, a merchant system 202, and a scoring compiler system 203. The client device 201 operated by a User 10 who is in the process of entering Player selection information for the purposes of effectuating formation of a User team roster 103 (prior Figures) by or authentication of eligibility via a merchant system 202. The modules, systems, and devices illustrated with respect to FIGS. 5A-5C may be differently arranged, operated, or constituted in other embodiments. For example, the merchant system 202 and the scoring compiler 203 may be merged as a single system and operated by a single entity. In other embodiments, a third party provider may be present to either authenticate a User or to replace one or more functions of the merchant system 202 or to provide the functions of the scoring compiler system 203.

The client device 201 includes a User Team Roster interface ("UI") 210 and a Player Pool module 206. Examples of the UI 210 are described with respect to FIGS. 1A-1C, above. The UI 210 is typically provided by the merchant system 202, such as when the UI 210 is implemented as part of a Web page received from a Web-based e-commerce system hosted or provided by the merchant system 202. In other embodiments, the UI 210 may be part of a standalone client application, such as a Stack Roster desktop or mobile application.

The UI 210 includes a user interface element 212. The UI element 212 may be any control, field, aspect, or other portion of the UI 210. For example, the UI element 212 may be a text field, a drop down menu, a selection group, a chooser, a button, a hidden field, or the like. In some embodiments, the user 10 may interact with the UI element 212, such as by clicking and dragging a movable control, editing a text field or pressing a button. In other embodiments, UI element 212 is inactive with respect to direct user interaction. For example, the UI element 212 may be a draggable element within a list control and/or a text element in a document tree that represents the UI 210.

In the illustrated example, the User 10 specifies a Player for a position via the UI element 212. Specifying other Users to interact with using the Stack Roster platform may include entering (e.g., typing) a user's name, team name or other information into an editable text field. In other embodiments, User selection options may include interacting with a drop down or other selection control to set or store the User profile information item (e.g., an address, phone number) in the UI element 212.

Then, the User 10 specifies a particular fantasy sport in order to select a Player pool from which to construct a roster 206 and also to uniquely designate an identity for this User team roster to facilitate multiple rosters within a given sport for the User. In the illustrated example, the module 206 is received from the Stack roster reconciler 200. For example, the module 206 may be a Web page or popup (possibly including JavaScript or other code) displayed via a Web browser of the client device 201. The Web page may include a user interface as well as corresponding logic for facilitating the specification of extended Player options. Example user interfaces of example modules are discussed in more detail with respect to FIGS. 1A-1C, above.

Once the User 10 has specified the unique User team roster 103, the module 206 determines, generates, or prepares a series of slots ordered to various positions in accord with the User's 10 selection in a manner as described above. The indication may be a textual representation of identity of the User team roster, such as a fictitious name or code that includes an alphabetic string (e.g., "HAL"), a numeric string (e.g., "1001"), an alphanumeric string (e.g., "APPT7"), a symbolic string (e.g., "%**!"), or some combination of the preceding. The indication of the User team roster may also or instead be or include a binary (e.g., not human-readable) representation of the User team roster item. In some embodiments, the name or code may be generated by the UI based upon a name given by the User. In some instances, the selection of a particular sport may generate an indication specifically for that sport.

In another embodiment, the indication may be a network identifier that identifies (directly or indirectly) a network-accessible computing system or module that is configured to provide the Player Pool information for that selected sport upon request. For example, the indication may be a network address, a host name, a uniform resource identifier, or the like. The indication will typically further include an identifier, key, or other argument that can be used by the network-accessible computing system to look up or otherwise access the second Player information.

The indication of the User team roster 103 is then entered into the UI element 212. This may be a manual or automatic process. For example, the module 206 may instruct the user 10 to enter (e.g., type or copy-paste) the indication of the User team roster 103 into the UI element 212. In another approach, the module 206 may automatically modify the UI element 212 to include the indication of the User team roster. For example, the module 206 may access the UI element 212 (e.g., by looking up its identifier in a DOM or other document data structure) and then modify the data stored in the element 212 (e.g., a slots 107 in the User team roster) to also include the indication of a Player selections by the User 10.

Next, the User team roster UI 210 transmits the User team roster and the indication of the Player selections, data as graphically represented in 103 (FIG. 2) to the merchant system 202. In some embodiments, the indication of the User team roster 103 will be transmitted along with some or all of the User profile. For example, if the indication of the User team roster includes a tag that has been inserted into data structure of the User team roster, such that when the User team roster (including the tag) will be transmitted to the merchant system 202, the merchant system can verify the User's entitlement to play and consequently transmitting the User's team roster to the Stack Roster reconciler. The User team roster, may, in a similar manner contain a tag indicating identities of other Users selected to play in a particular game using this User team roster 103. In other examples, the indication may be transmitted as a distinct element of a data structure allowing the indication to be stored distinctly from the indication.

The merchant system 202 may then process the received User team roster, the invitations, and the User 10 profile. For example, the merchant system 202 may User address verification, profile modifications, or similar operations based on its role in assure User payment to play. Doing so may include parsing out or extracting the indication of the User profile identification from User team roster so that the profile (or other information) stored therein can be isolated for purposes of payment verification or designating invited Users from a pool of such data stored in the User profile. In other embodiments, the merchant system 202 does not include any logic for processing (and does not otherwise interpret) one or more of the received User invitation information items. In such embodiments, the merchant system 202 may receive the invited User information with the User team roster that includes a tag as embedded within the invited and then forward or otherwise transmit the received items to some other system, such as the Scoring Compiler 203. In other embodiments, the invited User information is sent from the UI element 212 to the Stack Roster reconciler 200 through network means without the Merchant System altering the data structure.

After receiving and possibly processing the User team roster and included data items, the merchant system 202 may forward the items onwards to the Stack Roster reconciler for each of the invited Users after each User has been verified in the Merchant System 202. User rosters 103 are reconciled in accord with the method of FIG. 4A in order to cause the Scoring Compiler to initiate a new competition as requested by the user 10. Once each User is verified, optionally to include the status of having paid, the reconciling of the rosters occurs.

At a FIG. 5B, the intermediate play is shown. As a result of the actions of the Stack Roster reconciler 200, the fully reconciled rosters are either returned to the Merchant system, or, in a non-depicted embodiment, the Stack Roster reconciler 200 sends the reconciled rosters to the Scoring Compiler 203. One of the functions of the Scoring Compiler 203 is to garner all statistics for all players, and in a presently preferred embodiment, third party vendors send the information to the Scoring Compiler 203 using either of a "push" or a "pull" configuration to garner statistics on each of the Players represented by each of the tiles in the Player pool 101 as shown in FIG. 1A. In collecting all relevant statistics, the Scoring Compiler 203 serves as a data store of the latest and also historic statistics for each of the Players for perusal by the Users as well as for, ultimately, scoring the competition. In one embodiment, the tiles 105 A-E will include either the statistics themselves or a link directing the UI Element 212 to the statistics supplied by the Scoring Compiler 203 for display to inform the User in the Player selection process, as shown in FIGS. 1A through 1C.

Figure 4B:
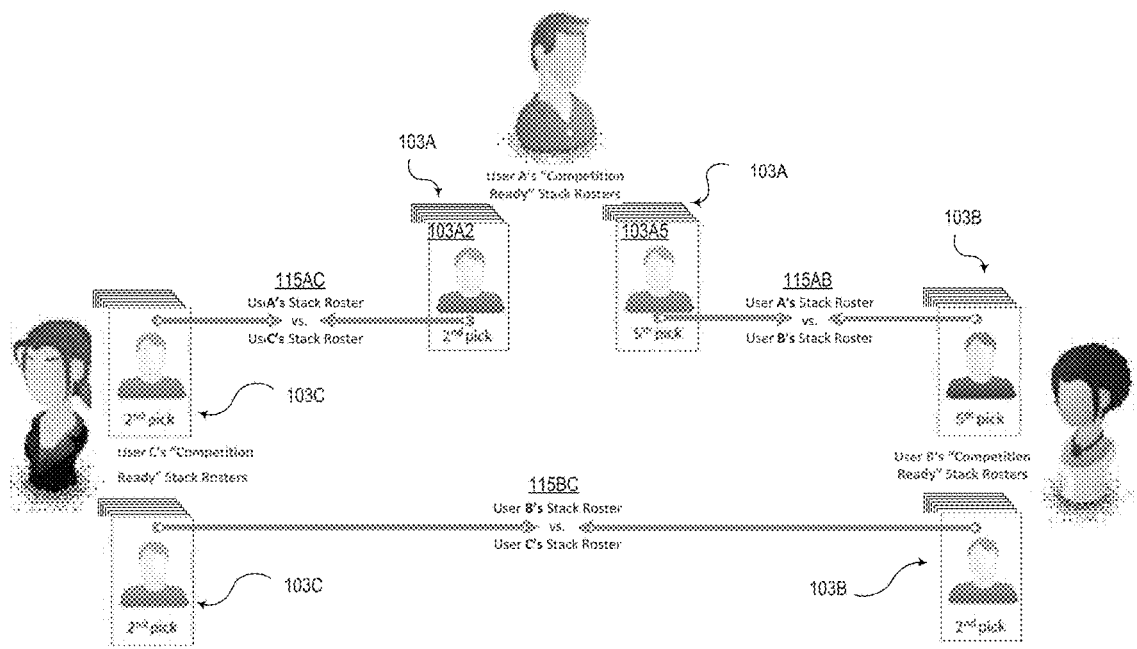
FIG. 4B is a graphical representation of a scheme for scoring during a "season" in an exemplary interface for enabling a Stack Roster "draft" for a fantasy sports game.

The Scoring Compiler 203 (or, as described above, the Merchant System 202 in communication with the Scoring Compiler 203) then interprets the received statistics and performs the appropriate or necessary functions to score each of the reconciled rosters in accord with the method depicted in FIGS. 4B and 4C, such as delivering intermediate scores to the UI element 212 for display on the Client Device 201, displaying standings, creating and storing specific User statistics such as scoring for distinct positions in the roster 103. The Scoring Compiler 203 may also transmit to the Player Pool Module statistics to enable Users to compile unique and new User team rosters for play, for example in Major League Baseball™, a second season after the All-Star break.

FIG. 5C illustrates data flows in an embodiment to complete the season. The arrangement of components and systems shown in FIG. 5C is similar to that of FIGS. 5A and B. In FIG. 5C, the Merchant System uses a network identifier to facilitate transmission of and access to extended all User team rosters and the reconciled Rosters as between several Users. In the completion of the competition The Merchant System 202, in an embodiment, compiles the statistical data for the season drawing from the Scoring Compiler 203 to generate and provide standings posted at a uniform resource identifier ("URI") that identifies a network-accessible system that is configured to provide the standings to each User in response to a request. In other embodiments, the URI may be directly parsed to determine an standings without interaction with a remote system. In some embodiments, a standings may be determined from the URI (e.g., as an embedded tag) and the UI element 212 directly, as standings may be determined by interacting based on the URI with a remote system.

Generating the URI by the Merchant System 202 may include interacting with the Stack Roster reconciler 200. For example, the Merchant System may transmit specified game information including User profiles to the Stack Roster reconciler 200, and after receiving the data, retrieves the appropriate statistics from the Scoring Compiler 203 to generate standings there for publication.

In an embodiment, the URI generated by the Merchant system 202 is then entered into the UI element 212 for display, as discussed above. In this example, the merchant system 202 forwards the reconciled rosters and the URI to the UI Element. The Scoring Compiler 203 then determines the specified those persons available for play based upon the setting of such an option within the User's profile, determining the appropriate URI, and then by communicating, based on the URI, with the Stack Roster reconciler 200. More particularly, the Scoring Compiler 203 transmits to the facilitator 200 a request based on the URI. In an HTTP-based embodiment, the request may be an HTTP GET that includes URI parameters, including any key-value pairs or other arguments that were part of the URI (e.g., id=12345). The Reconciler 200 then determines the scoring based on the competition identifier, such as by looking up the particular reconciled rosters based on a received identifier. The Stack Roster reconciler 200 then transmits the standings back to the UI element 212.

Note that the illustrated arrangement of modules may be differently constituted in some embodiments. For example, the Player Pool module 206 may be incorporated dynamically into the Scoring Compiler 203, as discussed with respect to FIG. 4B, above. As another example, the merchant system 202 and the Scoring Compiler 203 may be integrated as a single system, rather than as distinct systems as shown. Furthermore, the Stack Roster reconciler 200 may be a component of one of the other modules, such as the Scoring Compiler 203 or the merchant system 202.

In other embodiments, additional modules or systems may also be present. For example, some embodiments may include a third-party statistics ("TPL") provider that stores the statistics on the Scoring Compiler 203 to produce the resulting User scores.

Example embodiments described herein provide applications, tools, data structures and other support to implement a Stack Roster reconciler to be used to provide a platform for gaming. Other embodiments of the described techniques may be used for other purposes, including for extending a user interface generally and/or using an existing communication protocol or data records to provide, carry, or transmit information beyond that which the protocol is designed to represent or transport. In the following description, numerous specific details are set forth, such as data formats and code sequences, and the like, in order to provide a thorough understanding of the described techniques. The embodiments described also can be practiced without some of the specific details described herein, or with other specific details, such as changes with respect to the ordering of the logic, different logic, or the like. Thus, the scope of the techniques and/or functions described are not limited by the particular order, selection, or decomposition of aspects described with reference to any particular routine, module, component, and the like.

Figure 6:
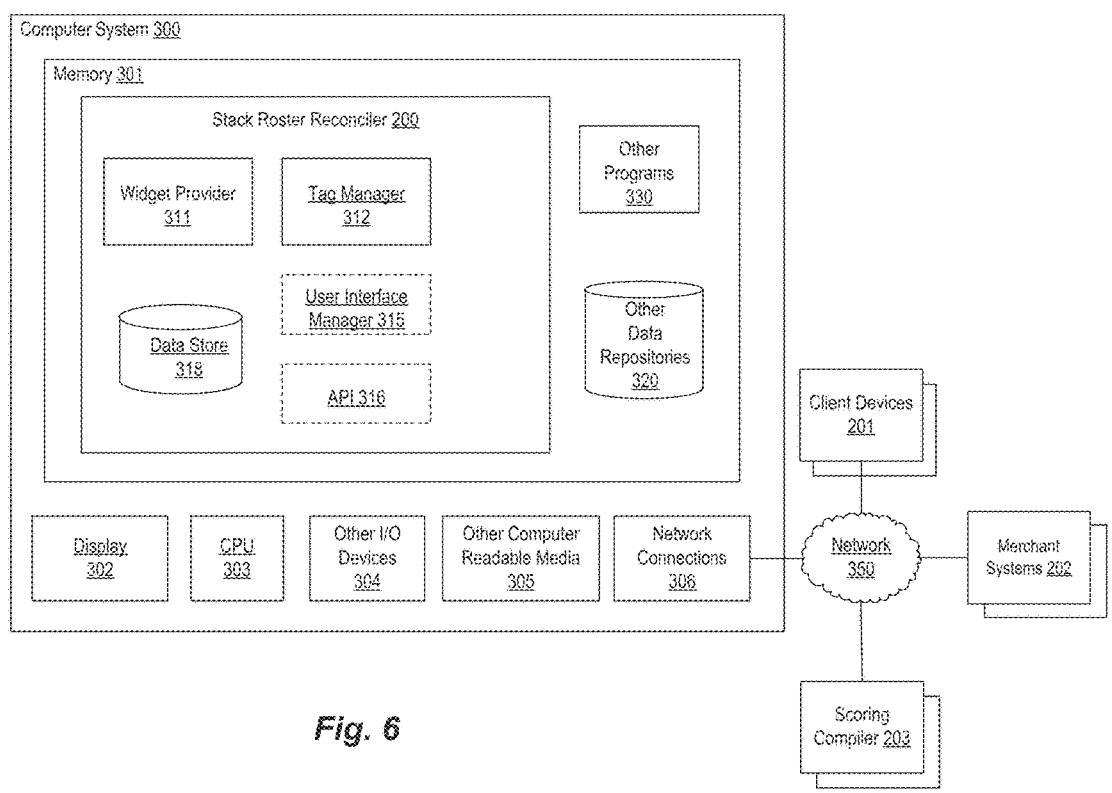
FIG. 6 is a block diagram of a computer network enabling a Stack Roster "draft" for a fantasy sports game.

Example Computing System Implementation. FIG. 6 is an example block diagram of an example computing system 300 for implementing a Stack Roster reconciler 200 according to an example embodiment. In particular, FIG. 4 shows a computing system 300 that may be utilized to implement a Stack Roster reconciler 200.

Note that one or more general purpose or special purpose computing systems/devices suitably instructed may be used to implement the Stack Roster reconciler 200. In addition, the computing system 300 may comprise one or more distinct computing systems/devices and may span distributed locations. Furthermore, each block shown may represent one or more such blocks as appropriate to a specific embodiment or may be combined with other blocks. Also, the Stack Roster reconciler 200 may be implemented in software, hardware, firmware, or in some combination to achieve the capabilities described herein.

In the embodiment shown, computing system 300 comprises a computer memory ("memory") 301, a display 302, one or more Central Processing Units ("CPU") 303, Input/Output devices 304 (e.g., keyboard, mouse, CRT or LCD display, and the like), other computer-readable media 405, and network connections 306 connected to a network 350. The Stack Roster reconciler 200 is shown residing in memory 401. In other embodiments, some portion of the contents, some or all of the components of the Stack Roster reconciler 200 may be stored on and/or transmitted over the other computer-readable media 305. The components of the Stack Roster reconciler 200 preferably execute on one or more CPUs 303 and facilitate the reconciliation of rosters and ultimately the scoring options as described herein. Other code or programs 330 (e.g., an administrative interface, a Web server, and the like) and potentially other data repositories, such as data repository 320, also reside in the memory 301, and preferably execute on one or more CPUs 303. Of note, one or more of the components in FIG. 6 may not be present in any specific implementation. For example, some embodiments may not provide other computer-readable media 305 or a display 302.

The Stack Roster reconciler 200, in one embodiment, includes a widget provider 311, a tag manager 312, a user interface manager 315, a application program interface (API) 316, and a data store 318. In other embodiments, functions performed by one or more of the illustrated components may be performed externally to the Stack Roster reconciler 200.

The Stack Roster reconciler 200 interacts via the network 350 with client devices 201, merchant systems 202, and Scoring Compiler 203. The network 350 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In some embodiments, the network 350 may be or include multiple distinct communication channels or mechanisms. The client devices 201 include mobile phones, smart phones, personal digital assistants, laptop computers, tablet computers, desktop computers, and the like.

Users or others (e.g., customer service representatives) may use the client devices 201 to construct User team rosters 103 or other items via the merchant systems 202. The merchant systems 202 in turn prepare User profiles, invite Users to play, facilitate online chats and conveys statistics garnered from the Scoring Compiler 203. The Scoring Compilers 203 are used to, at least garner and store Player statistics from sources including from third party vendors.

The widget provider 311 manages the storage and distribution of various modules, blocks, widgets, or the like to enable enhance functionality and to increase the appeal of the game during play, such as an online chat between Users in a particular game to enable "smack talk" among the Users. Another such widget might distribute latest Player interview clips to Users having selected that Player on their User team roster. For example, a developer may create a new widget and provide the widget to the Stack Roster reconciler 200 for storage and further distribution by the widget provider 311. The widget provider 311 may respond to requests received from client devices 201 or merchant systems 202 during the season. For example, a User may use one of the client devices 201 to interact with a Web page that includes a link to a Bank page that gives Users credits for later games based upon instantaneous standings, the link causing a widget to be retrieved by the client device 201 from the widget provider 311.

The tag manager 312 performs tag generation and translation services. For example, given a User and a stack roster, the tag manager 312 may generate a tag that is configured to represent that information. The tag manager 312 may also, given a tag or other identifier, respond with the other User stack rosters specified by the identifier. In some embodiments, some or all of the logic of the tag manager may be incorporated into a widget or a Scoring Compiler 203.

The UI manager 315 provides a view and a controller that facilitate user interaction with the Stack Roster reconciler 200 and its various components. For example, the UI manager 315 may provide interactive access to the Stack Roster reconciler 200, such that users or systems can obtain or configure widgets, generate tags, translate tags, and the like. In some embodiments, access to the functionality of the UI manager 415 may be provided via a Web server, possibly executing as one of the other programs 430. In such embodiments, a user operating a Web browser (or other client) executing on one of the devices/systems 201, 202, and/or 203 can interact with the Stack Roster reconciler 200 via the UI manager 315.

The API 316 provides programmatic access to one or more functions of the Stack Roster reconciler 200. For example, the API 316 may provide a programmatic interface to one or more functions of the Stack Roster reconciler 200 that may be invoked by one of the other programs 330 or some other module. In this manner, the API 316 facilitates the development of third-party software, such as user interfaces, widgets, tag translation services (e.g., for integrating functions of the Stack Roster reconciler 200 into Web applications), and the like. In addition, the API 316 may be in at least some embodiments invoked or otherwise accessed via remote entities, such as one of the Scoring Compilers 203, to access various functions of the Stack Roster reconciler 200.

The data store 318 is used by the other modules of the Stack Roster reconciler 200 to store and/or communicate information. The components of the system 200 use the data store 318 to record various types of information, including widgets and other controls, information about scoring and statistics provided by third-party vendors. Although the components of the system 200 are described as communicating primarily through the data store 318, other communication mechanisms are contemplated, including message passing, function calls, pipes, sockets, shared memory, and the like.

Enhancements Applied to Rosters. As described above with reference to FIG. 1B, the User must populate the User's team roster 103 from the Player candidates listed in the pool 101. In typical fantasy play, this step is known generally as the "Draft." In an "auction" Draft, each owner has an imaginary budget which he must use to purchase all his players in an auction format. Owners take turns nominating players for open bid. The owner who bids the highest on each player receives that player, reducing their remaining budget accordingly. Auction drafts are viewed as the more fair method since every owner begins on equal ground.

As, for example, in the NFL, there have evolved fantasy football draft strategies made to exploit specific talents of the various players at various positions. The most commonly used strategies are value based drafting and opinion based drafting. Value base drafting entails projecting the total fantasy point value for each player in the draft and then figuring their value with respect to other players at their position, while standard cheat-sheet based drafting requires ranking each player based on your opinion of worth, or other people's opinion of said player's worth.

In that the draft is conducted by interaction with a server, Users can configure scripts that allow player selection in "live" or "auto" formats. Live Drafts involve players utilizing real-time strategy and reactionary measures to acquire specific available players. Auto-drafts use preliminary draft rankings set by each team to automate the draft cycle and establish the teams. Live drafts are often preferred to auto formats as the live drafts give rise to contingencies in selection that are believed to require more skill to exploit opportunities. As one will readily appreciate in this context, the ability to purchase Enhancements, as explained below, adds a further layer of strategy to the Draft as a User can, through the skilled purchase of Enhancements, use the Enhancements to minimize the effect a particular weakness of an otherwise talented Player might have on that Player's earned statistics, and therefore infuse further value into procuring a Player in the Draft.

Each user will draft, or select, Players in the manner described above until all of the slots within each position 107A, 107B, 107C, 107D, 107E, and 107F on the roster are filled, such as described above.

Additional Enhancements. With a User's roster 103 being suitably filled with selections indicating User selections and prioritization and before play in any particular event begins, a User may purchase certain Enhancements (as that term is later defined below) to individual Players selected within his or her fantasy team. Enhancements may be of several sorts but are selected to "immunize" a Player's score in the hands of a User in the User's fantasy sports game from consequences of specific real-life performance when and if that sort of performance occurs.

By way of nonlimiting example, a User in the context of a fantasy football game, has purchased an exemplary Enhancement, in this case called "Sack Protection," for his starting quarterback for the duration of a designated game to be played after the purchase of the Enhancement. In the event the User's quarterback is sacked, the Enhancement will protect that User from the negative point repercussion that would normally occur in traditional fantasy play and nullify the positive point advantage that would normally accrue to his opponent.

As ought to be evident, these sorts of protections the Enhancements afford are focused and specific in nature. They will generally be a protection from a negative outcome. As is explained above, fantasy sports scoring is based upon statistics and those statistics are the principal means of melding scoring in and among Players that are not, themselves, playing on the same team. For that reason, statistics dominate the play of any fantasy sport. Through the application or utilization of an Enhancement, a player statistically increases the likelihood or odds of a more positive, desired or advantageous outcome. Within the context of competition, use of an Enhancement may provide one player with a potential competitive advantage over another.

In each instance, the nature of an Enhancement is a very tightly defined risk with a corresponding reward for assuming that risk, when successful, so as to make the tactical advantage narrow. Much of the enjoyment of Fantasy Sports comes in selecting and executing strategic and tactical decisions in the role of General Manager of a sports team. A User, by exploiting his or her knowledge of the sport and of the Players, can parlay their skilled selections of Players to optimize the statistical results the Players earn in competition. Because of that quality of skill in play, Enhancements are not meant to overpower the normal play, specifically the decisions made in the course of a defined season or in any particular game but meant, instead, to be a protection from a specific risk and to apply narrowly across each aspect of the sport for which they apply.

Enhancements are always tightly constrained to a specific statistic that characterizes a position. For example, a Player might buy an Enhancement called "Wild Pitches" for a pitcher that would, for the purpose of scoring in the fantasy baseball game, remove from statistics the scoring results from any pitch scored as "WP", i.e. when a pitch is too high, low, or wide of home plate for the catcher to field, thereby allowing one or more runners to advance or score during the game in question. Similarly, in the context of a fantasy hockey league, a User might purchase "Shoot Out Protection" such that any loss attributable to a shootout, i.e. a method of determining a winner in sports matches that would have otherwise been drawn or tied, wherein a single player takes one shot on goal from a specified spot, the only defender being the goalkeeper; the winning team being the one to score a goal that is unmatched by the other team. In that instance, for the purposes of the fantasy game, the User having the losing goalie for whom he or she purchased the protective Enhancement would not suffer the loss when the game's statistics are used for fantasy play. As a further explanation, it would violate the spirit of the invention to allow a User to purchase an Enhancement against the "Curse of the Bambino" such that in any match up, Players' statistics from play on the Yankees will always trump statistics earned in play for the Red Sox. Such an Enhancement would overwhelm other elements of play. A User should not be able to buy a win.

Naturally, the Enhancements are not limited to those set forth here. They are all very narrowly defined but are each of a very similar nature. They are each based upon protection from a single statistic that might otherwise be very important in determining an outcome of a fantasy sports game. For example, a User could purchase protection against a hole-in-one, which is a very narrow protection against a very well-defined risk, the risk, if matured will affect the outcome of the fantasy sports game, thereby full-filling the requirements of an Enhancement. In each instance, an Enhancement relates to particular risk and characterized by a specific event and possible effect when utilized within game play. Additionally, any particular Enhancement creates "new" and otherwise not possible scenarios under the construct of traditional, statically calculated fantasy sports.

Each of the individual Enhancements will have a specific causational relationship to an action or event that may or may not occur during a particular sporting event. In order for an Enhancement to be activated and benefit the player utilizing said Enhancement, two things must occur: first, a player must choose to activate the Enhancement or put it into play. Secondly, an action must occur during an actual sporting event that corresponds with the Enhancement that was activated or applied, thereby creating an element of risk and or chance for the player choosing to use an Enhancement. Each player, if possessing an Enhancement, may choose whether or not to apply said Enhancement prior to game play, not knowing whether or not the need for the Enhancement will actually be realized. For example, when a User chooses to utilize a "Sack Protection" Enhancement for his quarterback during a Fantasy Football contest, and should the quarterback not be sacked in the particular game for which protection is purchased, the Enhancement is still consumed in the course of the game. In the alternative event, should the User's quarterback be sacked, the Enhancement will protect that player from the negative point repercussion that would normally occur in traditional fantasy play and nullify the positive point advantage the sack would normally yield to his opponent.

Figure 7:
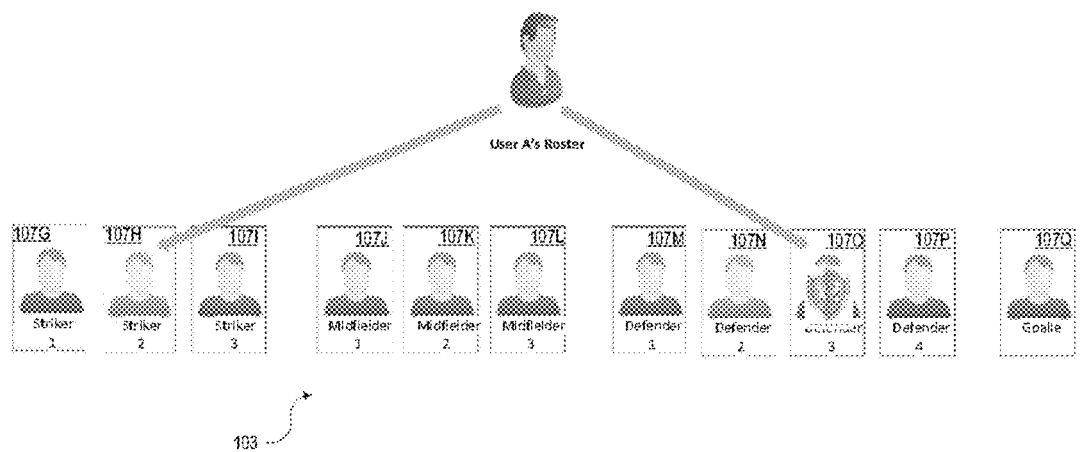
FIG. 7 depicts a graphical interface for showing a completed player roster in the context of professional soccer.

To further illustrate the mechanism for effecting the enhancements, consider the sport of professional soccer depicted in FIG. 7. In this exemplary illustration, a double captain enhancement might be purchased by a User. Just as before, the User will select a roster of players 107A-107Q. According to the conventional rules for fantasy soccer each User is allowed to choose ONE of their eleven players 107A-107Q to serve as the Captain of the squad prior to game play, in this case the number two striker 107H. The Captain's points are then doubled following a soccer match, which are added to the User's total points accrued from the match.

Describing now the exemplary Double Captain Enhancement, purchase of the Enhancement entitles the User applying the Enhancement to choose TWO members of their squad as Captains, as opposed to just one as in conventional fantasy soccer play, as described, thereby increasing the likelihood of high performance and positive point totals. The User will then have the point total from the superior performing player applied to their score, distinguishing only that particular player as the Captain. If neither scores, the Player loses a fixed number of points, say three for failing to identify a scorer in the game. The other player's point total will be treated as all of the other 10 players, 1:1 as opposed to a multiple as with the squad Captain.

Figure 8:
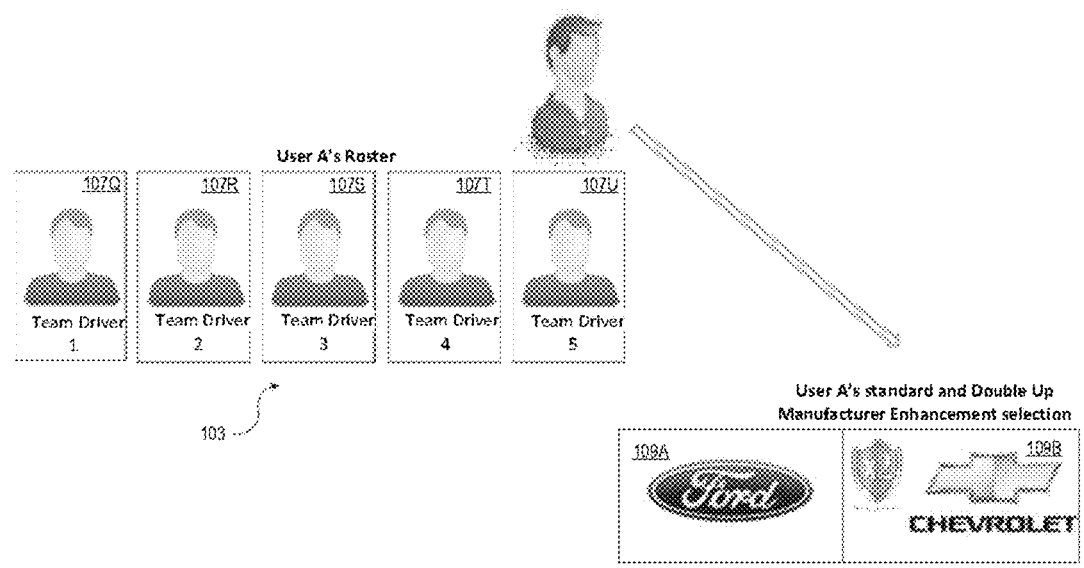
FIG. 8 depicts a graphical interface for showing a completed player roster in the context of NASCAR.

In still another example, depicted in FIG. 8, a Double-Up Manufacturer enhancement is available, which would be relevant in NASCAR fantasy play. According to the conventional rules for fantasy NASCAR each User is allowed to choose one car manufacturer each week of the 36 week season that they think will win that week's race. In the event the User makes an accurate prediction and the manufacturer of choice does in fact win the race, that User will be rewarded with 10 bonus points for that week's fantasy competition. For instance, a User may think that a Ford manufactured race car will win the Daytona 500 in this week's race. In the event the User is correct, they will receive the 10 bonus points for that particular week. The Double Up Manufacturer Enhancement provides the User utilizing the Enhancement with the right to choose 2 manufacturers 109A, 109B instead of the standardized fantasy NASCAR rule of one, thereby increasing the likelihood of being accurate and earning bonus points. If neither of the manufactures wins, the User loses points, for example, ten points, though the specific number of points might be adjusted according to probability.

In another example, a double point Enhancement is playable on a selected position (player) of choice in a roster. This, like that of the two captains enhancement, bears a penalty where the player fails to score. Such an Enhancement might not even be limited to a simple doubling of score but might exist as a challenge bet wherein a User can choose to put a multiplier on a challenge which will result in the points being received for a win to be multiplied by a selected multiplier, or deducted by the same multiplier for a loss.

In yet another exemplary enhancement, a User can place a Call Out on an individual Player in their roster which will triple the points they receive from that Player if the Call Out occurs during competition. For example: if a User places a K.O (knock out) Call Out on one of their UFC fighters on their fantasy team, the Player has to knock out their opponent to earn their User triple points. If the Player fails to knock out the opponent, the User loses triple the points on that bout.

In a similar manner, a Call Out can be made for such extraordinary events as a grand slam (In baseball, a grand slam is a home run hit with all three bases occupied by baserunners ("bases loaded"), thereby scoring four runs—the most possible in one play.), or a Hole in One (In golf, a hole in one or hole-in-one occurs when a player hits the ball directly from the tee into the cup with one shot.). Other such events include the occurrence of a kick return of over eighty yards in distance, an interception within football's "red zone," run back for a touchdown, or selecting the winner of a Penalty Shoot Out in soccer. These and other such unusual events in normal play of any of the sports that are the subject of Enhancements in fantasy play. As a result of purchasing an enhancement, a User would, in light of the occurrence of the designated one of these events would receive the benefit of a narrow exception to the scoring of ordinary fantasy play that would only occur under exceptional circumstances. In each case, the User assumes a commensurate risk of non-occurrence as well. The double-edged nature of the risk/reward paradigm keeps the User from simply purchasing an outcome. Unlike a side bet (i.e. a bet made regarding the occurrence or non-occurrence during a game of an event not directly affecting the game's final outcome), these enhancements have an effect on the underlying competition.

Figure 11:
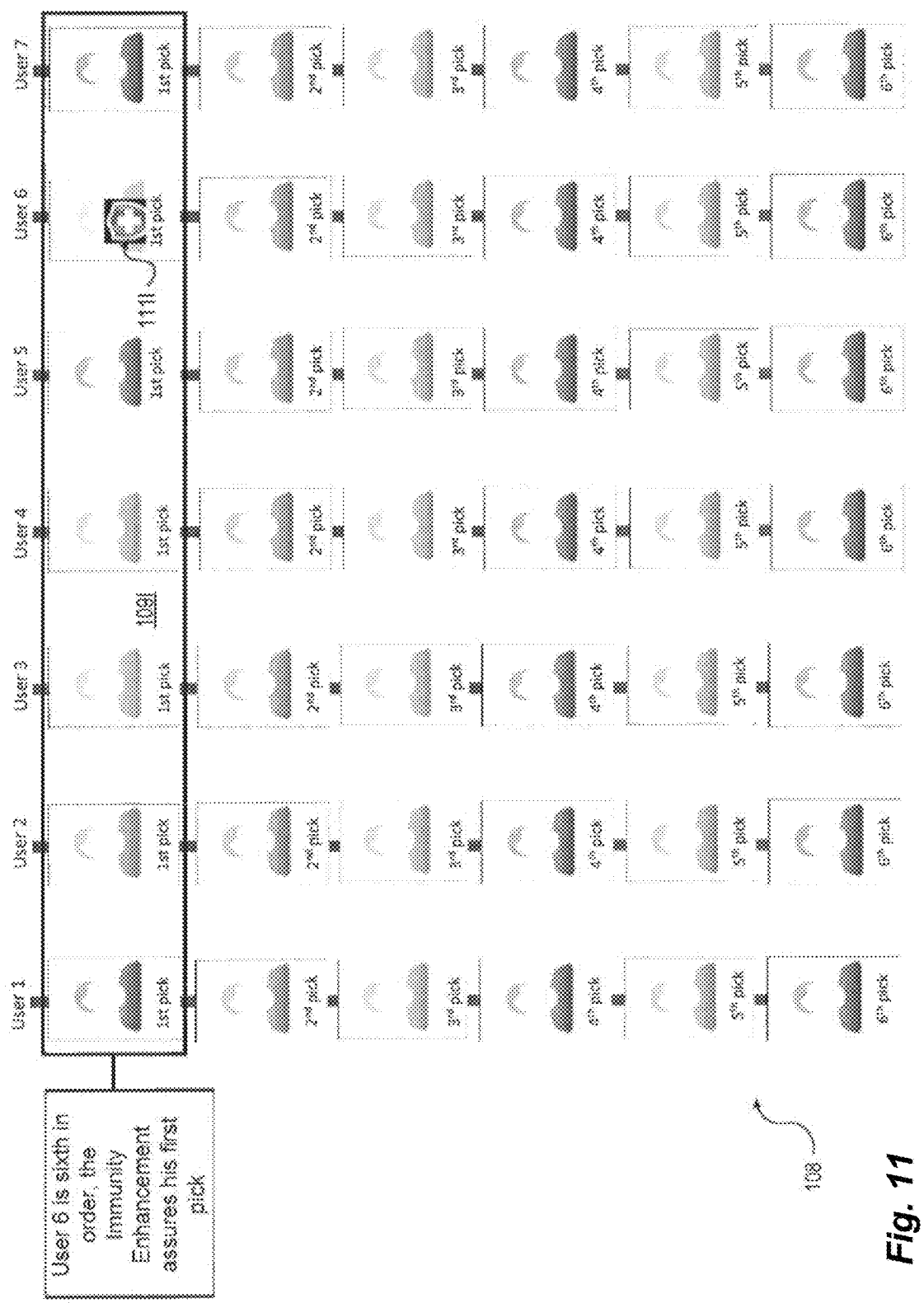
FIG. 11 is a graphical representation of the resulting roster in an exemplary interface for enabling an Immunity Enhancement for a fantasy sports game.

Immunity Enhancement. The Immunity Enhancement is described with reference to FIG. 11, and as noted above is intended to be applied during the process of drafting players to fill out rosters, such as described with reference to FIGS. 1A through 1C. In any round 1091 of the Draft 108 (shown in FIG. 11 as the first round 1091, but only as a nonlimiting example), a User may elect to assert an Immunity Enhancement 111I if that User has purchased such an Enhancement 111I causing it to be associated with his or her account. Such Enhancements are asserted and expended at the beginning of any relevant round of the draft.

When asserted, the Immunity Enhancement 111I allows a User to select, out of order, any Player remaining in the Pool 103. Enhancements are used before the first User in each round makes their picks of Players. In the embodiment where the order of the Users in any given round is selected by random chance, the Enhancements have to be asserted before the order of the round is selected so that if that same User is then selected as first in order, that User has consumed the Immunity Enhancement in vain. That vanity of such an assertion injects some risk with each contemplated assertion and makes the draft more interesting. As a result, User 6 will automatically select first in that round.

Likewise, the use of the Immunity Enhancement 111I in the Stack Roster embodiment assures the User of receiving their choice in that round. Unlike the other variants of the Immunity Enhancement 111I, within the context of the Stack Roster, the Immunity Enhancement is used against a specific User. The Stack Roster allows play among several Users by creating simultaneous games wherein pairs of Users submit their Stack Rosters as denoting all of their draft picks of Players in their order of their preference at each position within the team roster. As between each possible pair of players within the league, the Stack Rosters are then reconciled by the Stack Roster Engine to create rosters relative to each of the games played by the pairs. One User's roster relative to a second User is distinct from what it is relative to a third User. Thus, when a User seeks to exercise the Immunity Enhancement 111I in the context of Stack Roster Play, it only grants that User the first pick relative to the other User the first User designates.

In the context of explaining play of the Enhancement relative to the interface, the User seeking to exercise the Immunity Enhancement 111I does so by placing it over the Player selection in the User's Stack Roster to indicate the Player for which it is intended so that when the stack rosters are reconciled, that Player will belong to the User asserting the Immunity Enhancement even if the other User in the pair has selected the Player as an earlier pick in their own Stack Roster. Just as in the non-Stack Roster embodiments of the invention, if, by chance, the Player would have gone to that asserting User even without the benefit of asserting the Immunity Enhancement 111I, the User has consumed the Immunity Enhancement 111I without receiving a distinct benefit for having done so.

Figure 12:
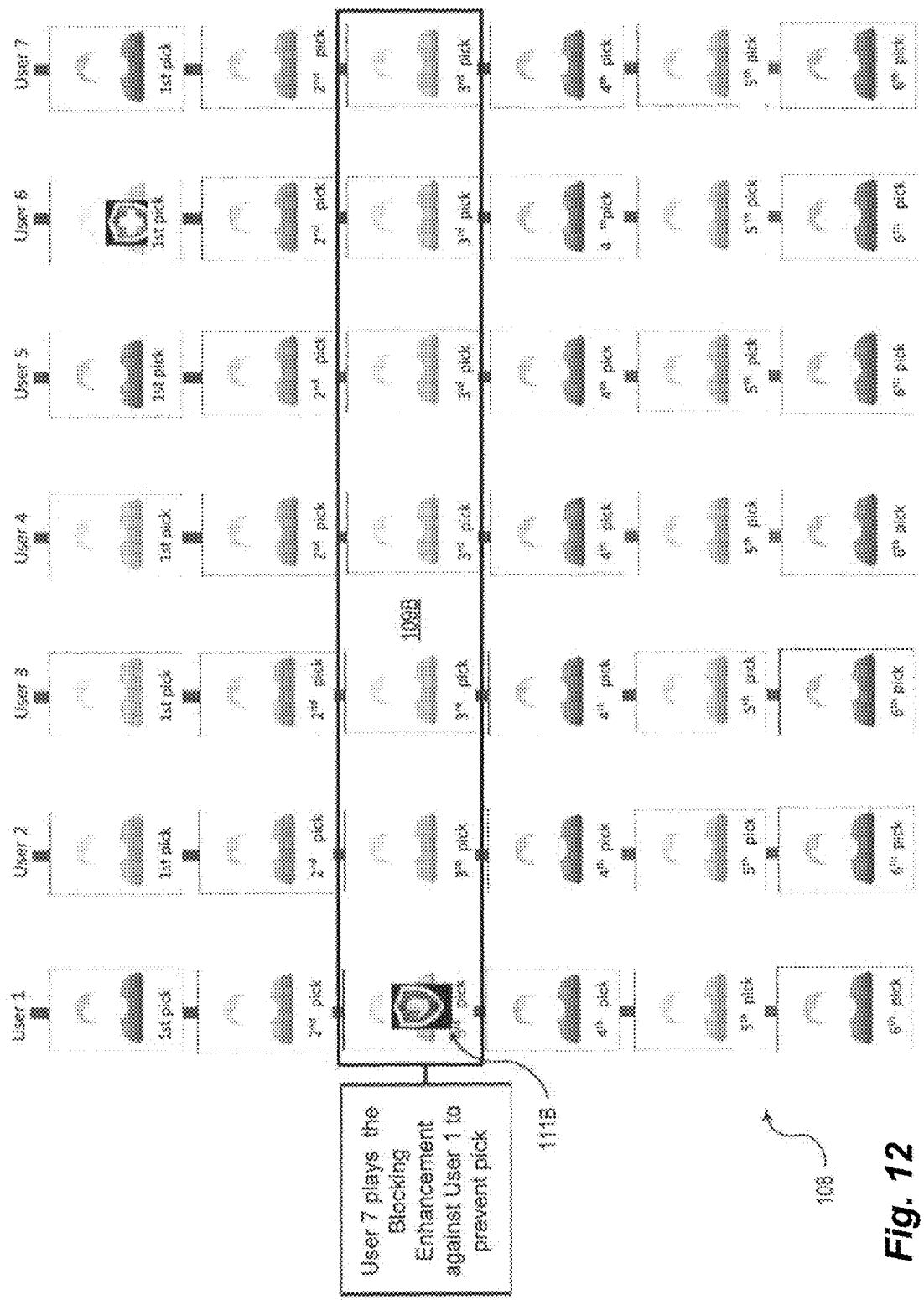
FIG. 12 is a graphical representation of the resulting roster in an exemplary interface for enabling a Blocking Enhancement for a fantasy sports game.

Blocking Enhancement. Moving now to the Blocking Enhancement 111B, FIG. 12 depicts its use in a later round of the draft (signified as later by the presence of the earlier use of the Immunity Enhancement in the topmost row, with the first pick). In the exemplary use of the Blocking Enhancement 111B, User 7 may realize that User 1 is building a team around a passing game. As the draft develops, User 7 perceives that User 1 will likely pick a wide receiver in the next round and also perceives that a particularly good wide receiver is available. To assure that the User 1 will not be able to complete the team, User 7 asserts the Blocking Enhancement 111B in this the third round of the draft. As such, User 1 is moved to the last position in that round of the draft and is unable to select as the wide receiver Player User 1 desires, as, for example, given the Blocking Enhancement 111B, User 2 decides to pick that Player taking him out of the pool 103. Use of the Blocking Enhancement 111B does not necessarily improve selection for User 7, the User asserting the Blocking Enhancement 111B, but does directly affect the User asserted against, in this case, User 1, by blocking the ability to obtain that desired Player. As described above, one can readily see the offensive and defensive nature of these two Enhancements.

Figure 9:
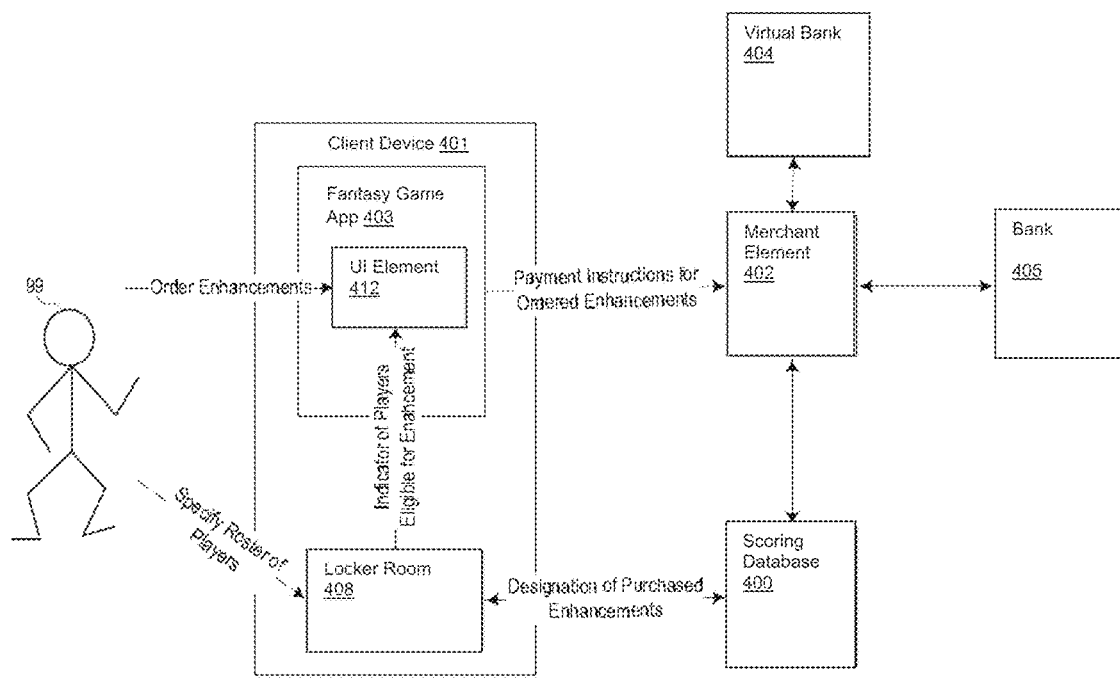
FIG. 9 depicts a system for allowing a User to purchase specific Enhancements to the fantasy sport game.

Enhancement Platform and Structure. With reference to FIG. 9, the User 99 interacts with a client device 401. The illustrated arrangement of the client device 401 includes a Fantasy Game App 403 including a User Interface Element 412. The Fantasy Game App 403 may be nothing more than a browser in one "thin client" embodiment, wherein the user interface is enabled by an API at the server.

The User Interface Element 412 is described, in part, above with reference to the Draft as well as a Locker Room 408, which is simply a memory store for keeping a database of a User's selected roster and any such Enhancements a User might have purchased. (Because the information explained here as stored in the Locker Room 408 replicates what is stored in the Scoring Database 400, in at least one "thin client" embodiment, the method does not require that the Locker Room 408 actually be stored anywhere on the Client Device 401 in a nonvolatile form except as a transient element in memory for display to the User.) Any part of the depicted system shown as the Client Device may be enabled in a browser as a part of, for example, an HTML5-enabled API resident on the server and would be used through interaction with a User's browser whether on a portable device such as a smartphone, tablet or laptop, or on a larger device such as a desktop computer or even as a part of a television or set-top box interacting with a cable supplier.

A second part of the system addresses the limiting factor, i.e. game theory dictates that the Enhancement cannot simply be free and unlimited in supply or the game deteriorates to nothing resembling a competition. For that reason, Enhancements must be purchased or earned or a combination of both. The mechanics of the transaction are handled, in the system, by a merchant system 402, with in various transactions interacting with either or both of a virtual bank 404 and a bank 405 (i.e. through either a credit card or some other prepaid credit with the system) and, ultimately, a scoring database 400.

Because the price of the Enhancement, by its nature, reduces the net winnings possible, a User 99 is capable of playing a strategy by which they may enhance their chances of winning at a price or, in the reverse situation, minimize their chances of losing. Consistent with Von Neumann's postulation of the minimax strategy of Game Theory, the Enhancements allow for an additional element of control of the outcome at a price.

As shown in FIG. 9, a User acquires Enhancements by ordering them through interaction with the UI element 412, essentially shopping for them. In one embodiment of the system, the pricing for each of the Enhancements is set by the Fantasy Game App 403 and is specific to each of the Players on the roster stored in the Locker Room 408. Thus, by way of nonlimiting example, if a User has Ben Roethlisberger of the Pittsburgh Steelers on the User's roster and wishes to purchase "Sack Protection" for Week 4 of the NFL 2013 Season, the price of the protection might be set much higher given the three sacks he suffered in Week 3 against the Chicago Bears. By the same token, the system would prevent the purchase of "Sack Protection" relative to Marshawn Lynch of the Seattle Seahawks as he is a Running Back and such protection would not be meaningful relative to him. In an alternate embodiment of the system, Enhancements would attach to the full roster and not to a single player and would protect a User's team for the duration of the event, e.g. a "Week" in the NFL. Either embodiment is appropriately claimed below as within the scope of the invention.

Once a price is set, further optional rules are possible to further limit the use of the Enhancements. For example, in one nonlimiting embodiment, payment occurs in either of two means:

1. Through purchase, whereas the total value is paid for utilizing an accepted Bank credit or debit card.
2. Through use of a combination of an accepted Bank credit or debit card and virtual currency, herein referred to as the Token, except that no Token or Tokens may be used to satisfy more than 50% of the total purchase price.

While the purchasing scheme above is not limiting, it is included to demonstrate that the value of the enhancements sounds both in the real and in the virtual worlds and that constraints can be used to modify the price and frequency of use of the Enhancement, thereby giving further value to the well-timed employment of the Enhancement in a close or hard-fought season. Each purchase is effected through interaction with the UI Element 212 in its communication with the Merchant system. In accord with the rules, a User 99 may make such purchases as the User's available credit in the respective Virtual Bank 404 and the Bank 405 will allow in such proportions as the relevant rules require.

To further explain the working of the Merchant system 402, it is presumed that each User 99 will have an account and profile such that the Merchant system 402 can transact business with each of the Virtual Bank 404 and the Bank 405. In some embodiments, a User 99 has placed a credit card at the disposal of the Merchant system for the purpose of satisfying transaction prices in real money. Similarly, wins from prior games or particular performance of the User 99 may have allowed the User 99 to accumulate credits in the Virtual Bank 404.

Using the UI Element 412, the User 99 within the Fantasy Game App 403, where, in one embodiment, a "Game Store" is presented to the User 99 through an API allowing the User to browse for and select various Enhancements for Purchase. By hitting an "Acquire Enhancement" button, the User 99 would be shown a selection of Enhancements specific to the particular sport, and indeed in an embodiment described above, specific to the particular Players on the User's roster. Because the User 99 will have established a profile and roster relative to that sport, the Fantasy Game App will display each available Enhancement, along with the specific nature of the Enhancement and the cost for that Enhancement. The User 99 would then make selections and the Enhancements would be placed in a "shopping cart" for transfer to the Locker Room 408 once the User 99 pays for the Enhancements.

The Fantasy Game App 403 would then prompt the User 99 to consummate the sale at a "check out" page where the Enhancement(s) previously selected would be listed with their corresponding cost(s) along with the total amount of cost for the purchase. Advantageously, in some embodiments, a User 99 will also be shown and must agree to the Terms and Conditions of the purchase. After agreement, in applicable, the Fantasy Game App 403 would provide the User 99 with an option to apply as many of the User's Tokens as might be available according to the User's balance and such rules as are applicable to the purchase of the Enhancements. To repeat the example above, the User 99 would be able to apply up to a value not to exceed that of 50% of the total cost of the Enhancement purchase price. Once any Tokens (virtual currency) have been applied to the purchase as those are negotiated through the Virtual Bank 404, the Merchant system 402 will now attempt to negotiate payment of the remaining total purchase price through the Bank 405. In one embodiment, the Fantasy Game App 403, will generate a payment page where the User 99 will be asked to populate the necessary credit/debit card information to pay for the total balance of the purchase. In another embodiment, the payment information is saved along with the User's profile. In either instance, the User is charged through interaction with the Bank 405, at the User's direction.

The client device 401 operated by a User 99 to purchase Enhancements using the merchant system 202. The modules, systems, and devices illustrated with respect to FIG. 9 may be differently arranged, operated, or constituted in other embodiments. For example, the Fantasy Game App 403 and the scoring database 400 may be merged as a single system and operated by a single entity. In other embodiments, a third party provider may be present to either authenticate a User or to replace one or more functions of the merchant system 402 or to provide the functions of the Fantasy Game App 403.

The Fantasy Game App 403 includes a user interface element 412. The UI element 412 may be any control, field, aspect, or other portion of the UI 412. For example, the UI element 412 may be a text field, a drop down menu, a selection group, a chooser, a button, a hidden field, or the like. In some embodiments, the user 10 may interact with the UI element 412, such as by clicking and dragging a movable control, editing a text field or pressing a button. In other embodiments, UI element 412 is inactive with respect to direct user interaction. For example, the UI element 412 may be a draggable element within a list control and/or a text element in a document tree that represents the UI 412.

As described above, the User 99 has determined a roster through participation in the draft. This roster as associated with the User 99 is stored in the Scoring Database 400 through interaction with the Fantasy Game App 403 in a manner as described above. The purpose of the Scoring Database 400 is to ascribe scores to each of the Users participating, in a fashion as described above. To do so, there must be an accurate indication of the Players upon whose performance and statistics capturing that performance will yield the User's score.

In another embodiment, the indication may be a network identifier that identifies (directly or indirectly) a network-accessible computing system or module that is configured to provide the Player Pool information for that selected sport upon request. For example, the indication may be a network address, a host name, a uniform resource identifier, or the like. For example, the Fantasy Game App 403 may instruct the User 99 to enter (e.g., type or copy-paste) the indication of the User team roster 103 into the UI element 412. In another approach, the Fantasy Game App 403 may automatically modify the UI element 412 to include the indication of the User team roster associated with such Enhancements as the User 99 has purchased. For example, the Merchant system 402 may access the Scoring Database 400 (e.g., by looking up its identifier in a DOM or other document data structure) and then modify the data stored in the Scoring Database 400 (e.g., slots 107 in the User team roster) to also include the indication of such Enhancements purchased through the User's interaction with Fantasy Game App 203 and necessary to suitably reflects the scoring in light of the purchased Enhancements.

The Scoring Database 400 (or, in an alternate as described above, the Merchant system 402 in communication with the Scoring Database 400) first receives and then interprets the received statistics and performs the appropriate or necessary functions to score each of the User's rosters in accord with the Enhancements that each User has purchased. Having determined scores, the Scoring Database 400 presents them to the Fantasy Game App 403 for displaying standings, displaying specific User statistics in response to queries from the User 99 through the UI Element 412 such as for scoring for distinct positions in the roster 103.

Preferably Users register on a game server, creating a profile and account in order to participate. Thus, in one presently preferred embodiment of the invention, a user must first create a User profile in order to login to the system (in most cases according to conventional methods, for example, using the Username and corresponding Password for that User's previously established account).

Once the User has the ability to log into their account on the game server, the User would, in one exemplary embodiment, elect to navigate into the "Game Store" and select "Acquire Enhancement." Upon selection, the User would move to an "Enhancement Options" screen specific to the particular sport for which they have established a profile.

Acquisition of the Enhancement may be through a purchase, for example in exchange for a cost (for purposes of the nonlimiting example, expressed in US dollars) for each particular Enhancement. The user would then make their selection(s) and the Enhancements would be placed into a shopping cart. Alternatively, the acquisition may be through an exchange of some token or "virtual currency" earned or purchased through prior play on the server. In one embodiment, virtual currency would also be expressed in terms of buying power, i.e. US dollars in this example. Once the User has elected by which terms the acquisition would take place, the User would be "taken" to the "check out" page where the Enhancement(s) previously selected would be listed. After the User approves of the terms of exchange and affirms the conditions of the acquisition, the User's profile is credited with ownership of the Enhancement(s). Upon completing the transaction, the User is free to utilize said Enhancement(s) in game play.

In addition (or instead) of those discussed above, certain embodiments of the inventive game include two Enhancements related to the selection or use of players. The first exemplary Enhancement is based upon User selection of a particular player. The second Enhancement is based upon actions in a particular round of the draft. The first Enhancement is used offensively as it assures the User of a specific Player selection; the second Enhancement is used defensively as it prevents another Player from making a selection. Respectively, they are called, herein, the Immunity Enhancement and the Blocking Enhancement—and they are the sword and the shield in practicing the inventive draft.

Figure 10:
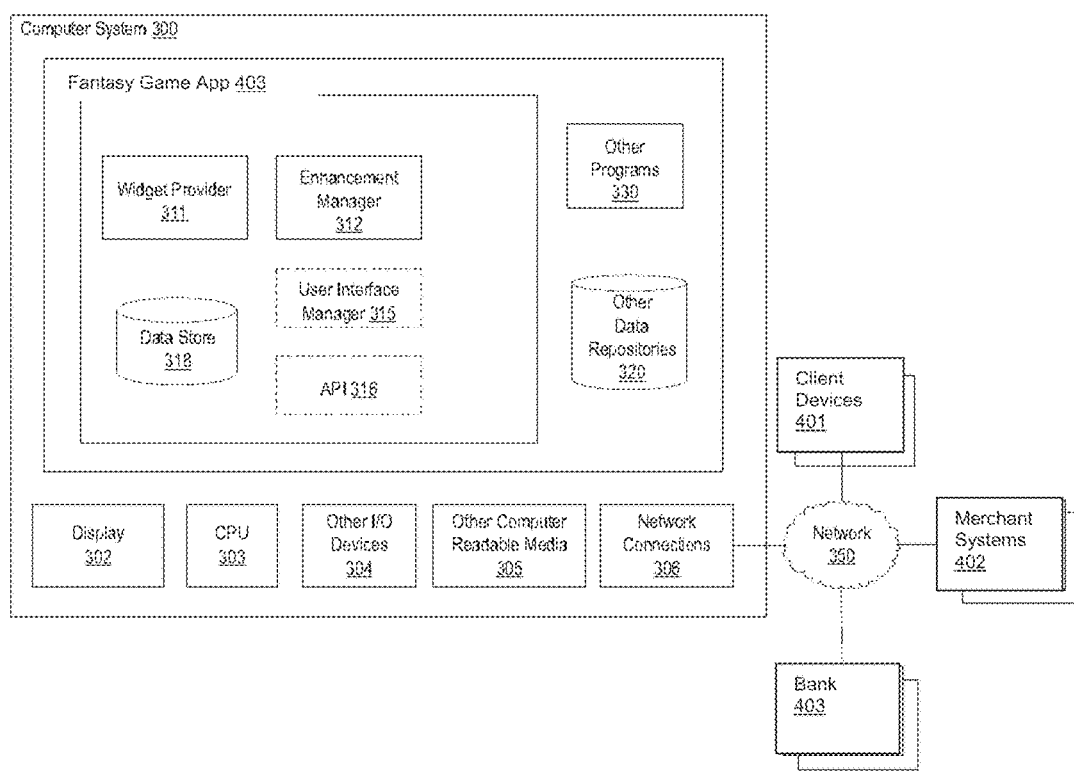
FIG. 10 is a block diagram depicting a server for facilitating fantasy sport play with the inclusion of Enhancements.

FIG. 10 is an example block diagram of an example alternate embodiment computing system 300 for implementing a Scoring Database 400 according to another exemplary embodiment. In particular, FIG. 10 shows a computing system 300 that may be utilized to implement the Fantasy Game App 403.

Note that one or more general purpose or special purpose computing systems/devices suitably instructed may be used to implement the Fantasy Game App 403. In addition, the computing system 300 may comprise one or more distinct computing systems/devices and may span distributed locations. Furthermore, each block shown may represent one or more such blocks as appropriate to a specific embodiment or may be combined with other blocks. Also, the Fantasy Game App 403 may be implemented in software, hardware, firmware, or in some combination to achieve the capabilities described herein.

In the embodiment shown, computing system 300 comprises a Fantasy Game App 403, a display 302, one or more Central Processing Units ("CPU") 303, Input/Output devices 304 (e.g., keyboard, mouse, CRT or LCD display, and the like), other computer-readable media 305, and network connections 306 connected to a network 350. The Fantasy Game App 403 is shown residing in memory within the computing system 300. In other embodiments, some portion of the contents, some or all of the components of the Fantasy Game App 403 may be stored on and/or transmitted over the other computer-readable media 305. The components of the Fantasy Game App 403 preferably execute on one or more CPUs 303 and facilitate the reconciliation of rosters and ultimately the scoring options as described herein. Other code or programs 330 (e.g., an administrative interface, a Web server, and the like) and potentially other data repositories, such as data repository 320, also reside in the memory 301, and preferably execute on one or more CPUs 303. Of note, one or more of the components in FIG. 10 may not be present in any specific implementation. For example, some embodiments may not provide other computer-readable media 305 or a display 302.

The Fantasy Game App 403, in one embodiment, includes a widget provider 311, a Enhancement manager 312, a user interface manager 315, a application program interface (API) 316, and a data store 318. In other embodiments, functions performed by one or more of the illustrated components may be performed externally to the Fantasy Game App 403.

The Fantasy Game App 403 interacts via the network 350 with client devices 401, merchant systems 402, and Scoring Database 400. The network 350 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In some embodiments, the network 350 may be or include multiple distinct communication channels or mechanisms. The client devices 401 include mobile phones, smart phones, personal digital assistants, laptop computers, tablet computers, desktop computers, and the like.

Users or others (e.g., customer service representatives) may use the client devices 401 to construct User team rosters 103 or order other items via the merchant systems 402. The merchant systems 402 in turn prepare User profiles, invite Users to play, facilitate online chats and conveys statistics garnered from the Scoring Database 400. The Scoring Database 400 is used to, at least, garner and store Player statistics from sources including from third party vendors.

The widget provider 311 manages the storage and distribution of various modules, blocks, widgets, or the like to enable enhance functionality and to increase the appeal of the game during play, such as an online chat between Users in a particular game to enable "smack talk" among the Users. Another such widget might distribute latest Player interview clips to Users having selected that Player on their User team roster. For example, a developer may create a new widget and provide the widget to the Scoring Database 400 for storage and further distribution by the widget provider 311. The widget provider 311 may respond to requests received from client devices 401 or merchant systems 402 during the season. For example, a User may use one of the client devices 401 to interact with a Web page that includes a link to a Bank page that gives Users credits for later games based upon instantaneous standings, the link causing a widget to be retrieved by the client device 401 from the widget provider 311.

The Enhancement manager 312 performs Enhancement generation and redemption services. For example, given a User 99 and a User roster, the Enhancement manager 312 may generate a database entry that is configured to represent that User's purchase information. The Enhancement manager 312 may also, given an indication of an Enhancement or other identifier, respond with the other User in a game specified by the identifier to indicate the User's redemption of a particular Enhancement. In some embodiments, some or all of the logic of the Enhancement manager may be incorporated into a widget or a Fantasy Game App 403.

The UI manager 315 provides a view and a controller that facilitate user interaction with the Fantasy Game App 403 and its various components. For example, the UI manager 315 may provide interactive access to the Locker Room 208 to make adjustments to the starting line up or to facilitate trades of Players with other Users, such that users or systems can obtain or configure widgets, generate Enhancements, reconcile scores in light of Enhancements, and the like. In some embodiments, access to the functionality of the UI manager 315 may be provided via a Web server, possibly executing as one of the other programs 330. In such embodiments, a user operating a Web browser (or other client) executing on one of the devices/systems 401, 402, and/or 403 can interact with the Roster reconciler 400 via the UI manager 315.

The data store 318 is used by the other modules of the Fantasy Game App 403 to store and/or communicate information. The components of the Fantasy Game App 403 use the data store 318 to record various types of information, including widgets and other controls, information about scoring and statistics provided by third-party vendors. Although the components of the Computer System 300 are described as communicating primarily through the data store 318, other communication mechanisms are contemplated, including message passing, function calls, pipes, sockets, shared memory, and the like.

In an example embodiment, components/modules of the Fantasy Game App 403 are implemented using standard programming techniques. For example, the Fantasy Game App 403 may be implemented as a "native" executable running on the CPU 303, along with one or more static or dynamic libraries. In other embodiments, the Fantasy Game App 403 may be implemented as instructions processed by a virtual machine. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VB Script, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the Fantasy Game App 403 (and the reconciler and other components), such as in the data store 318, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 318 may be implemented as one or more database systems, file systems, or any other technique for storing such information, or any combination of the above, including implementations using distributed computing techniques.

Different configurations and locations of programs and data are contemplated for use with techniques of described herein. In addition, the modules may reside on client or server systems that are physical or virtual computing. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the Fantasy Game App 403 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored as non-transitory contents on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system for enabling networked fantasy sports game play, comprising:
   a server computer system, the server computer system being communicatively coupled to a plurality of client devices over a network;
   the server computer system further having a data store, the data store containing data indicating a plurality of available players at a plurality of available positions;
   the server computer system further having stored programming instructions operable by the server computer system to:
      present to a first user at a first client device from among the plurality of client devices a representation of the plurality of available players, and to receive from the first client device a first user roster drawn from the plurality of available players at the plurality of positions, the first user roster further comprising a prioritized list of multiple players at each of the plurality of positions;
      present to a second user at a second client device from among the plurality of client devices a representation of the plurality of available players, and to receive from the second client device a second user roster drawn from the plurality of available players at the plurality of positions, the second user roster further comprising a prioritized list of multiple players at each of the plurality of positions;
      wherein the first user roster and the second user roster contain overlapping selections of players from among the plurality of available players; and
      receive an invitation from the first user via the first client device, and to send the invitation to the second user at the second client device, the invitation requesting fantasy game play between the first user and the second user;
   the server computer system further having a stack roster reconciler, the stack roster reconciler causing the server computer system to compare the first user roster and the second user roster on a position-by-position basis and in a prioritized fashion beginning with a first pick from each of the first user roster and the second user roster and proceeding as necessary to one or more subsequent picks from each of the first user roster and the second user rosters in order to produce a first user stack roster and a second user stack roster, each of the first user stack roster and the second user stack roster comprising a unique set of a single player at each of the plurality of positions;
   the stack roster reconciler further causing the server computer system to present the first user stack roster and the second user stack roster to each of the first user and the second user;
   the server computer system further having an enhancement manager, the enhancement manager comprising a user interface element enabling the first user, via the first client device, to obtain an enhancement from among a plurality of possible enhancements, the enhancement manager further causing the server computer system to receive an instruction from the first user to play the enhancement and to apply the enhancement against the second user, wherein the enhancement affects the composition or the scoring of the second user stack roster; and
   the server computer system further having a scoring compiler, the scoring compiler being in communication with a scoring database of statistical performance of each of the players and causing the server computer system to produce a first comparative score for the fantasy game play as a function of the first user stack roster and the second user stack roster and to send an indication of the first comparative score to the first client device and the second client device.

2. The system of claim 1, wherein the first user roster comprises seven positions and six players at each of the seven positions.

3. The system of claim 1, wherein the server computer system further comprises stored programming instructions operable by the server computer system to:
   present to a third user at a third client device from among the plurality of client devices a representation of the plurality of available players, and to receive from the third client device a third user roster drawn from the plurality of available players at the plurality of positions, the third user roster further comprising a prioritized list of multiple players at each of the plurality of positions;
   the stack roster reconciler further causing the server computer system to compare the first user roster and the third user roster on a position-by-position basis and in a prioritized fashion beginning with a first pick from each of the first user roster and the third user roster and proceeding as necessary to one or more subsequent picks from each of the first user roster and the third user rosters in order to produce an additional first user stack roster and a third user stack roster, each of the additional first user stack roster and the third user stack roster comprising a unique set of a single player at each of the plurality of positions;

the stack roster reconciler further causing the server computer system to present the additional first user stack roster and the third user stack roster to each of the first user and the third user;

the scoring compiler further causing the server computer system to produce a second comparative score for the fantasy game play as a function of the additional first user stack roster and the third user stack roster and to send an indication of the second comparative score to the first client device and the third client device.

4. The system of claim 3, wherein:

the stack roster reconciler further causes the server computer system to compare the second user roster and the third user roster on a position-by-position basis and in a prioritized fashion beginning with a first pick from each of the second user roster and the third user roster and proceeding as necessary to one or more subsequent picks from each of the second user roster and the third user rosters in order to produce an additional second user stack roster and an additional third user stack roster, each of the additional second user stack roster and the additional third user stack roster comprising a unique set of a single player at each of the plurality of positions;

the stack roster reconciler further causing the server computer system to present the additional second user stack roster and the additional third user stack roster to each of the second user and the third user;

the scoring compiler further causing the server computer system to produce a third comparative score for the fantasy game play as a function of the additional second user stack roster and the additional third user stack roster and to send an indication of the third comparative score to the first client device and the third client device;

the scoring compiler further causing the server computer system to determine an overall score between the first user, the second user, and the third user as a function of the first comparative score, the second comparative score, and the third comparative score.

\* \* \* \* \*